(12) United States Patent
Matsubara et al.

(10) Patent No.: US 7,216,021 B2
(45) Date of Patent: May 8, 2007

(54) METHOD, SYSTEM AND COMPUTER PROGRAM FOR MANAGING ENERGY CONSUMPTION

(75) Inventors: Masahiro Matsubara, Chiyoda-ku (JP); Yasushi Harada, Chiyoda-ku (JP); Yasuo Sato, Chiyoda-ku (JP); Nobuhisa Kobayashi, Chiyoda-ku (JP); Junichi Yamada, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 10/902,119

(22) Filed: Jul. 30, 2004

(65) Prior Publication Data

US 2005/0096797 A1 May 5, 2005

(30) Foreign Application Priority Data

Oct. 30, 2003 (JP) ............................. 2003-369770

(51) Int. Cl.
*G05D 23/00* (2006.01)
(52) U.S. Cl. .................. 700/295; 700/22; 700/276; 700/277; 700/286; 700/291
(58) Field of Classification Search ................ 700/286, 700/291, 295, 22, 276, 277, 278; 315/294; 236/47, 91 D; 705/412
See application file for complete search history.

(56) References Cited

U.S. PATENT DOCUMENTS 5,801,940 A * 9/1998 Russ et al. ................. 700/276
6,216,956 B1 * 4/2001 Ehlers et al. ................. 236/47
6,633,823 B2 * 10/2003 Bartone et al. ............. 700/295
2004/0002792 A1 * 1/2004 Hoffknecht ................. 700/295

FOREIGN PATENT DOCUMENTS

JP 2002-258934 9/2002

OTHER PUBLICATIONS

Patent Abstracts of Japan for JP 2002-258934.
Computer Generated English Language Translation of JP 2002-258934.

* cited by examiner

*Primary Examiner*—Leo Picard
*Assistant Examiner*—Charles Kasenge
(74) *Attorney, Agent, or Firm*—Crowell & Moring LLP

(57) ABSTRACT

A system for managing energy consumption has a data storage module, a calculation module and an operation planning module. The data storage module stores an operational past record of a unit belonging to a facility to be managed by the system. The calculation module calculates wasteful energy consumption for the unit based on the operational past record stored in the data storage module. The operation planning module generates an operational plan for the unit belonging to the facility based on the wasteful energy consumption calculated by the calculation module.

16 Claims, 18 Drawing Sheets

FIG.5
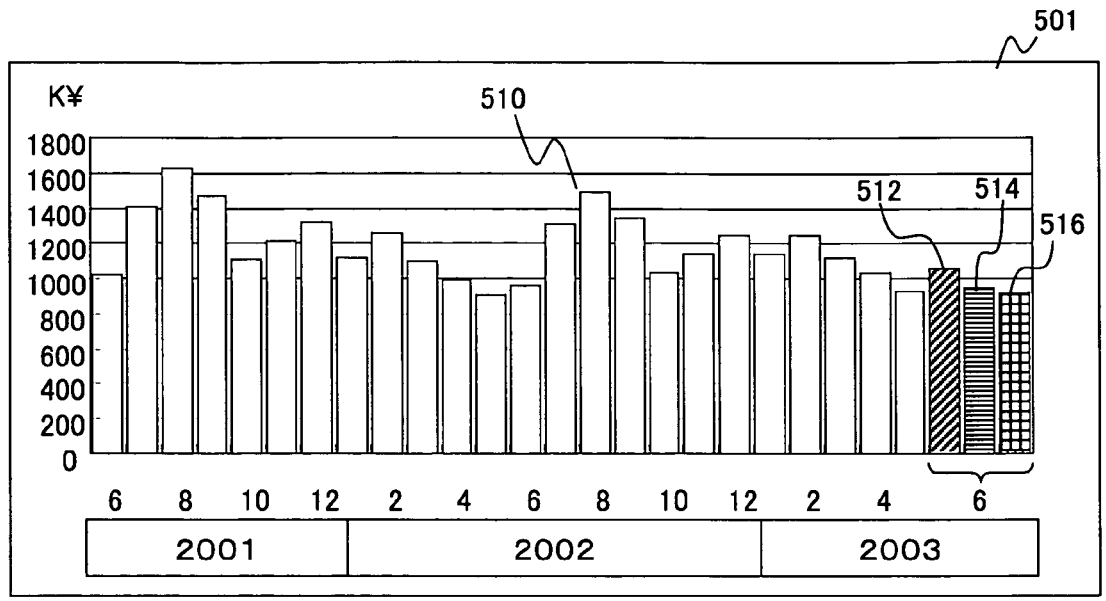
<Prediction for June>
| | | | Cost reduction | Rate of reduction |
|---|---|---|---|---|
| ▨ Nominal operation : | 1052 K¥ | | | |
| ≡ Same setting as this month : | 987 K¥ | | −65K¥ | −6.2% |
| ▦ Next month (new setting) : | 97 K¥ | | −78K¥ | −7.2% |
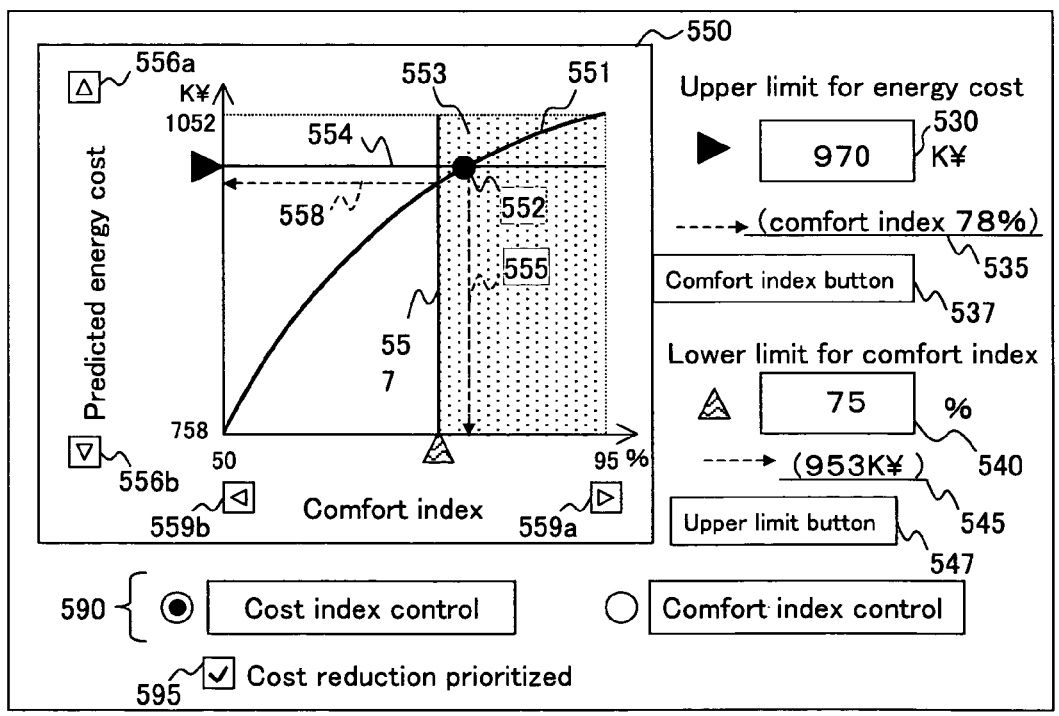

FIG.6
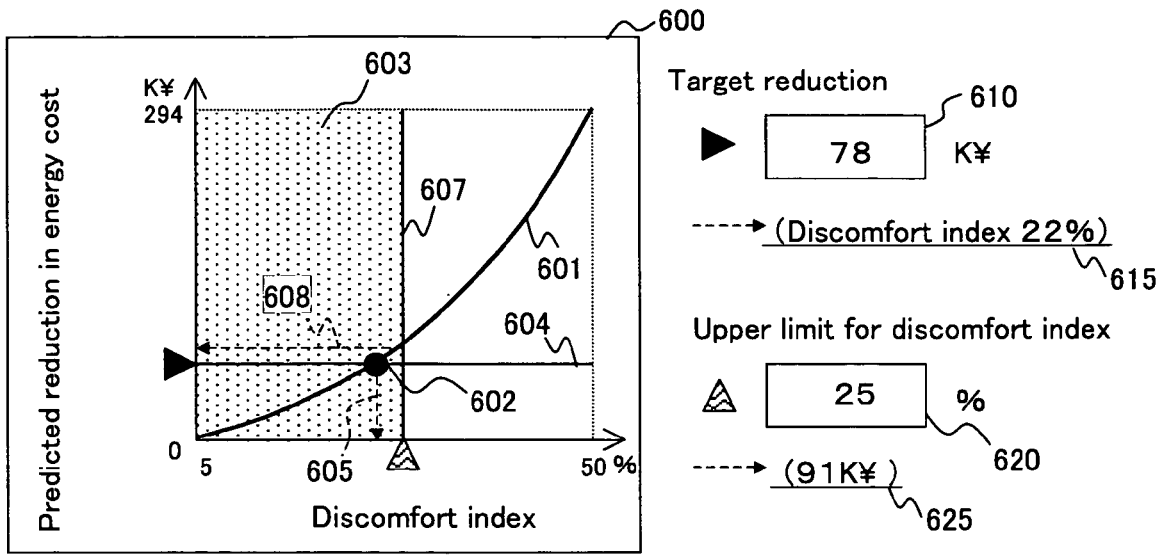
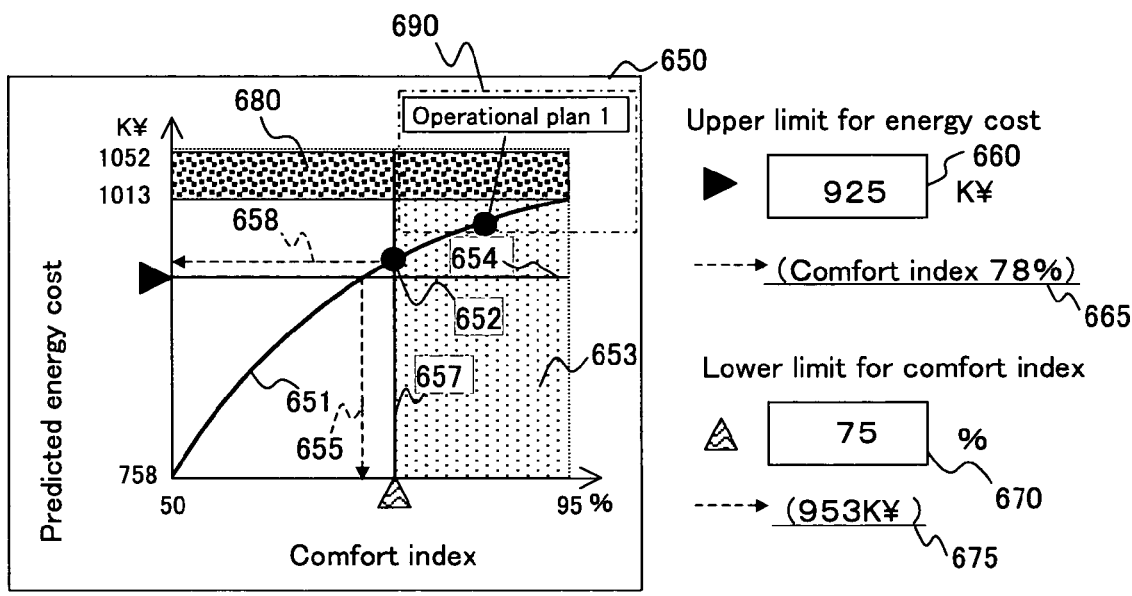

FIG.10
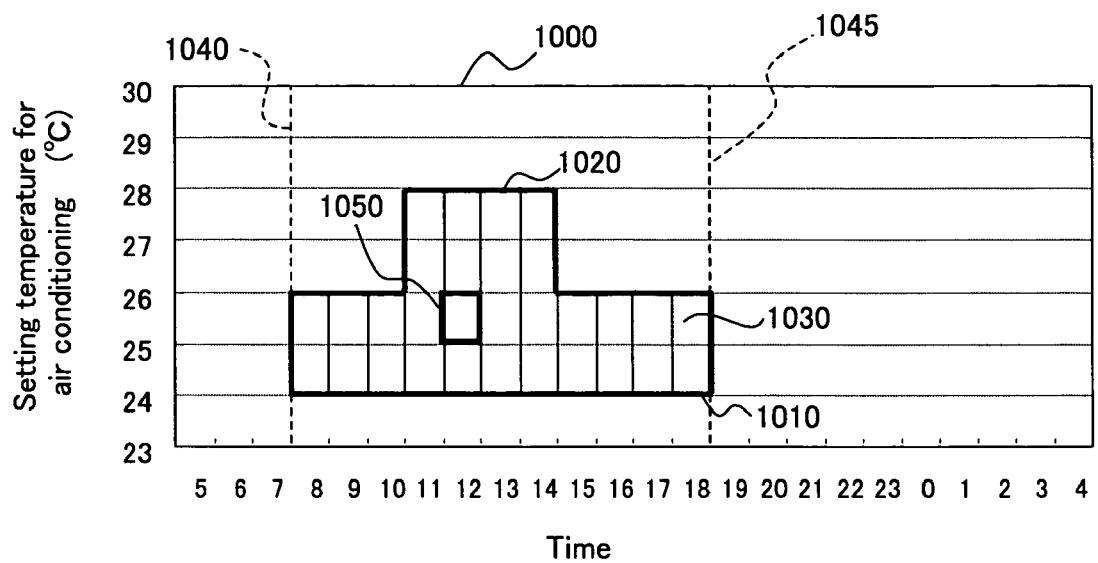
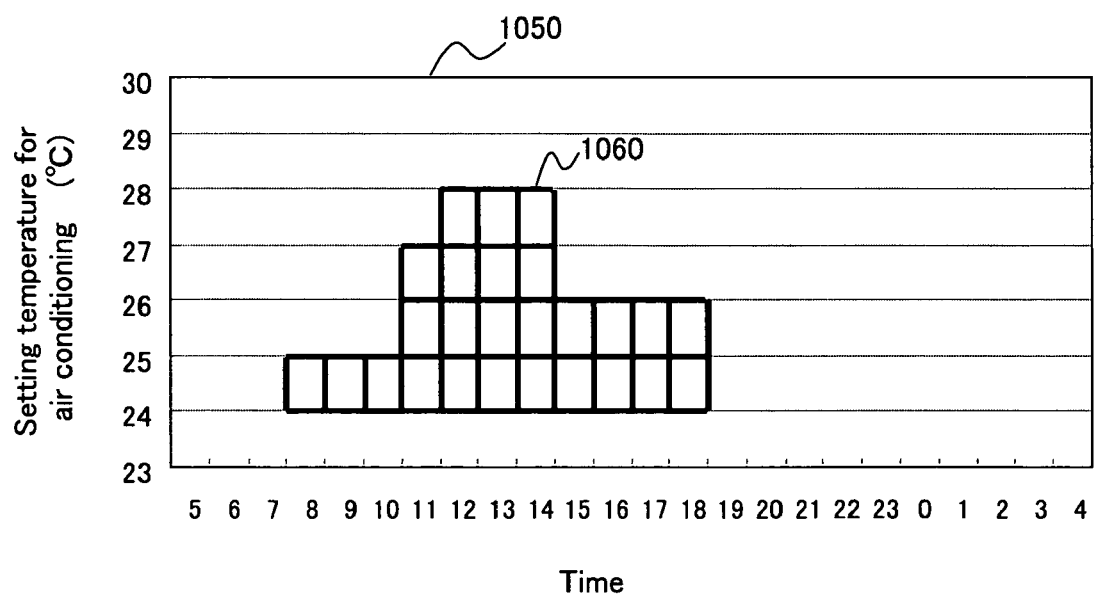

FIG.11

Contents of control for today

Energy management system controls the following

| Item | Time | Location | Notes |
|---|---|---|---|
| Temperature setting for air conditioning | All day | All offices | Button for setting temp |

Please manually control the following

| Item | Time | Location | Notes |
|---|---|---|---|
| Lunchtime turn off | 12:00 | Guest room | |
| Cancel lunchtime turn off | 13:00 | Guest room | |

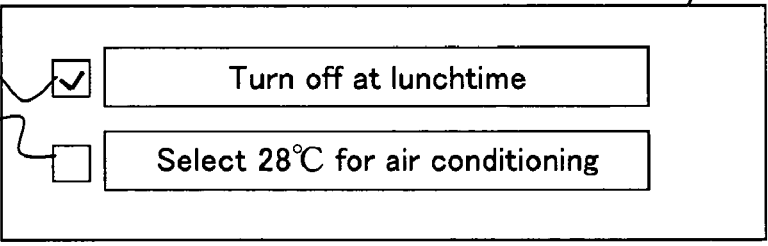

☑ Turn off at lunchtime
☐ Select 28°C for air conditioning

FIG.12
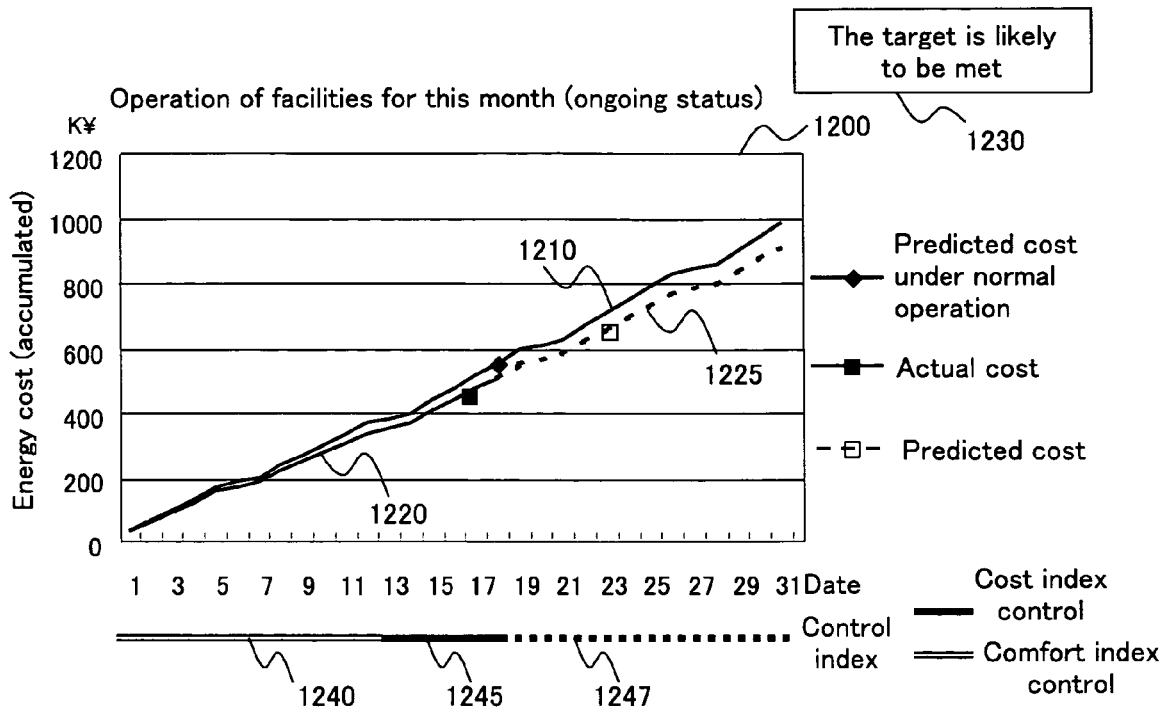
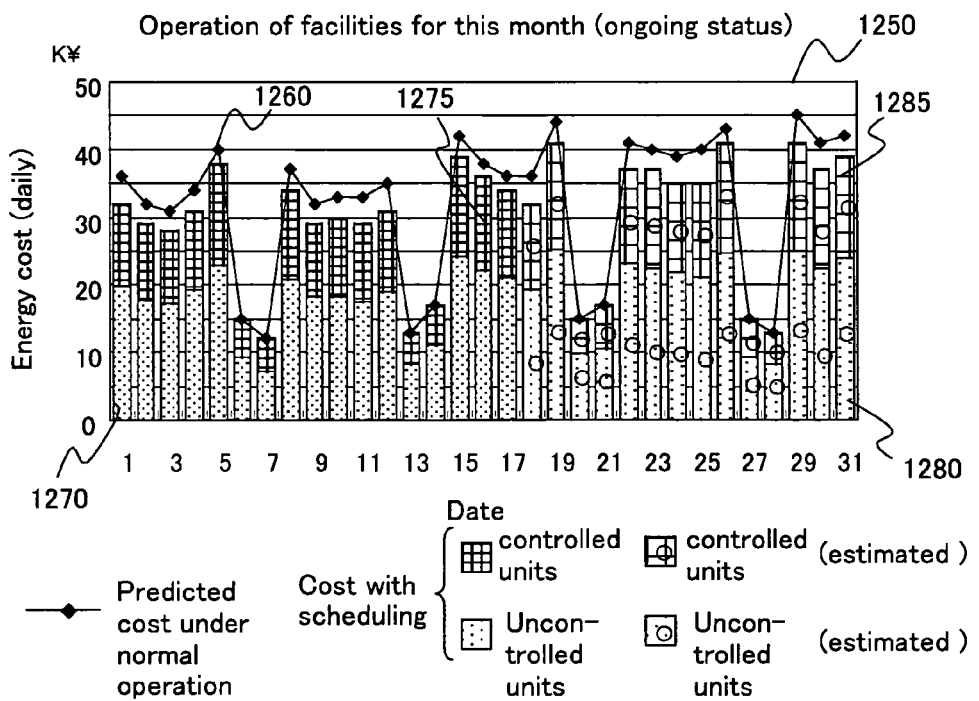

FIG.13
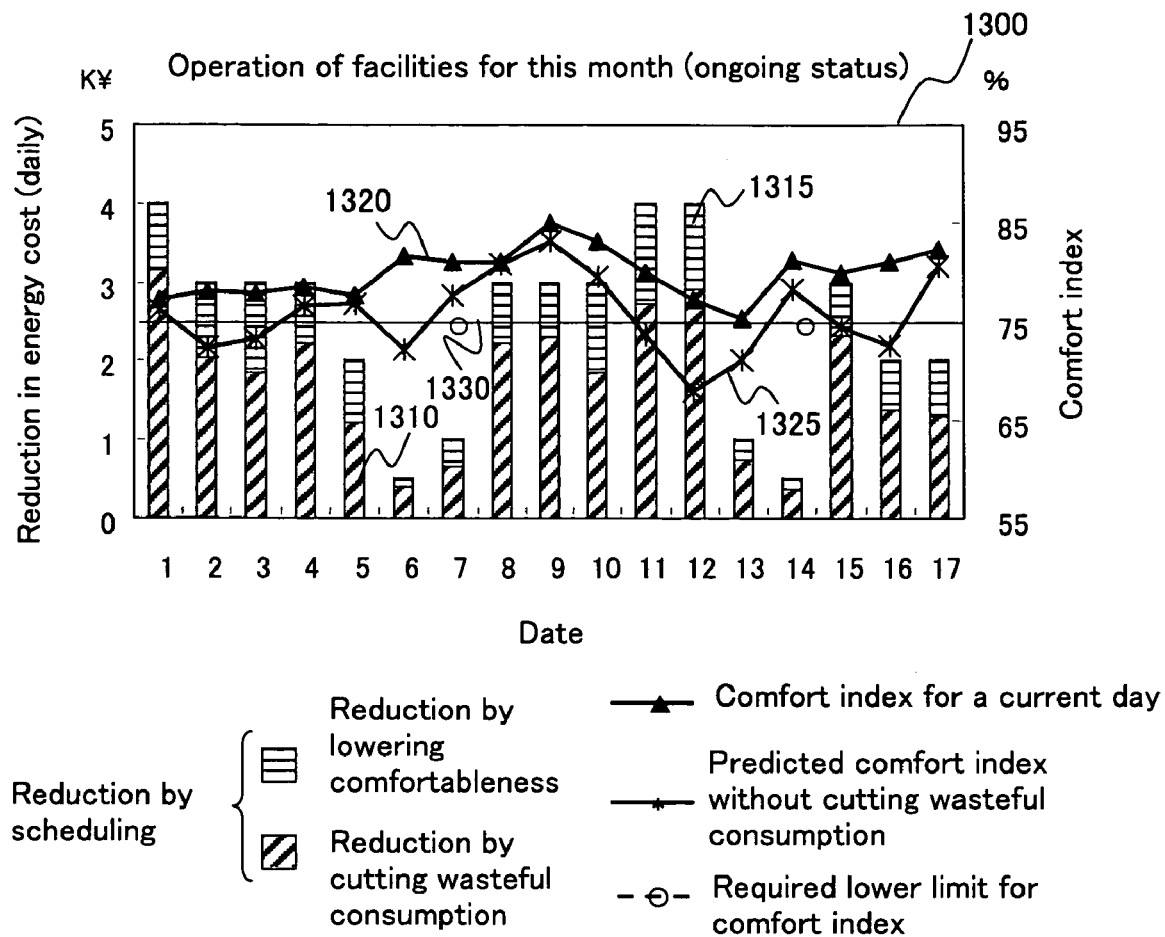
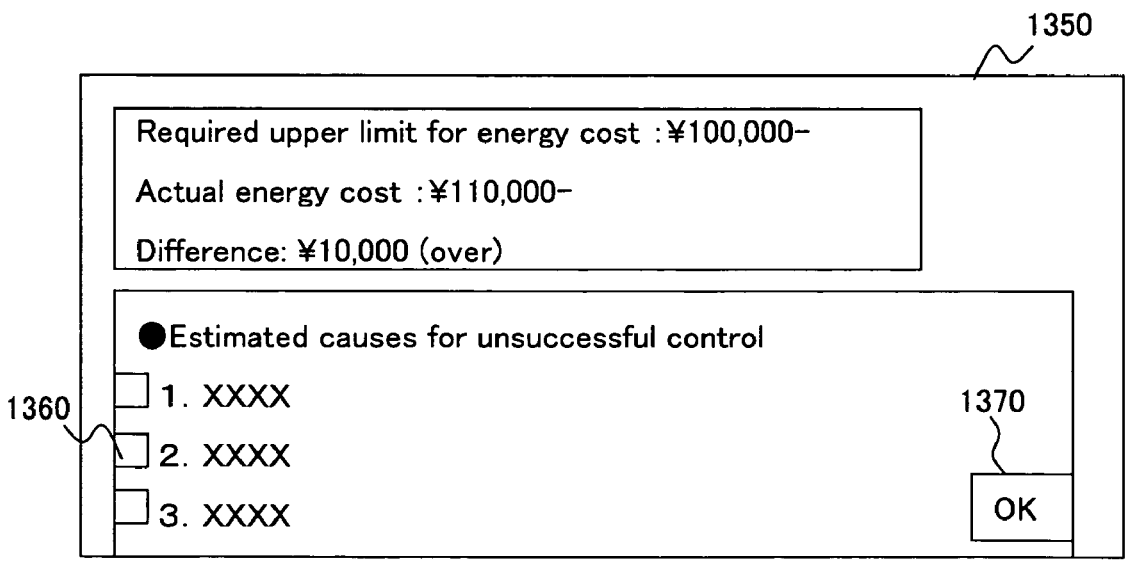

FIG.15
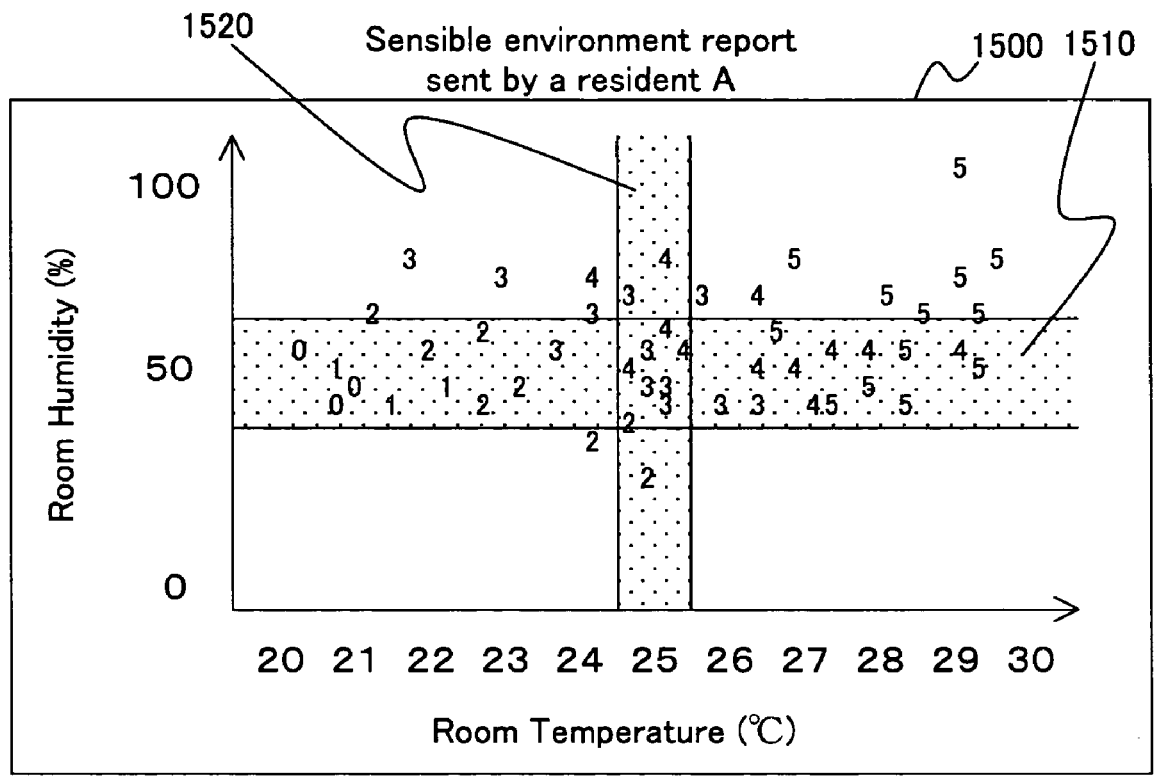
Numerals 0 – 5 represent ranks. 0: comfortable 5: very hot
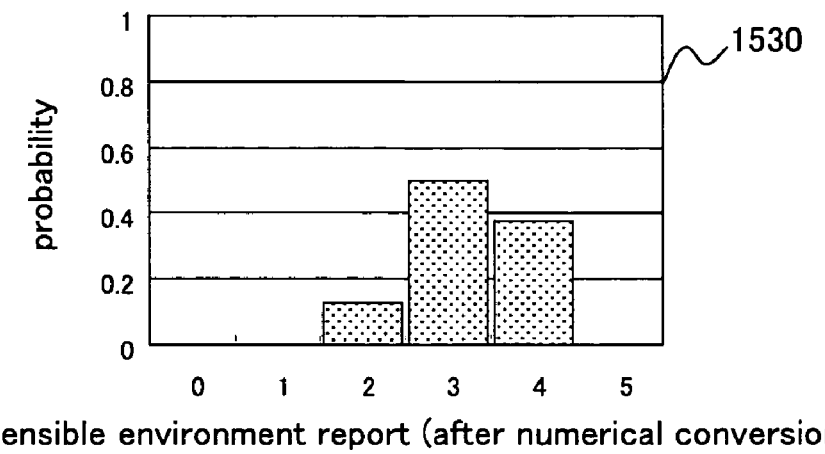
sensible environment report (after numerical conversion)

FIG. 17
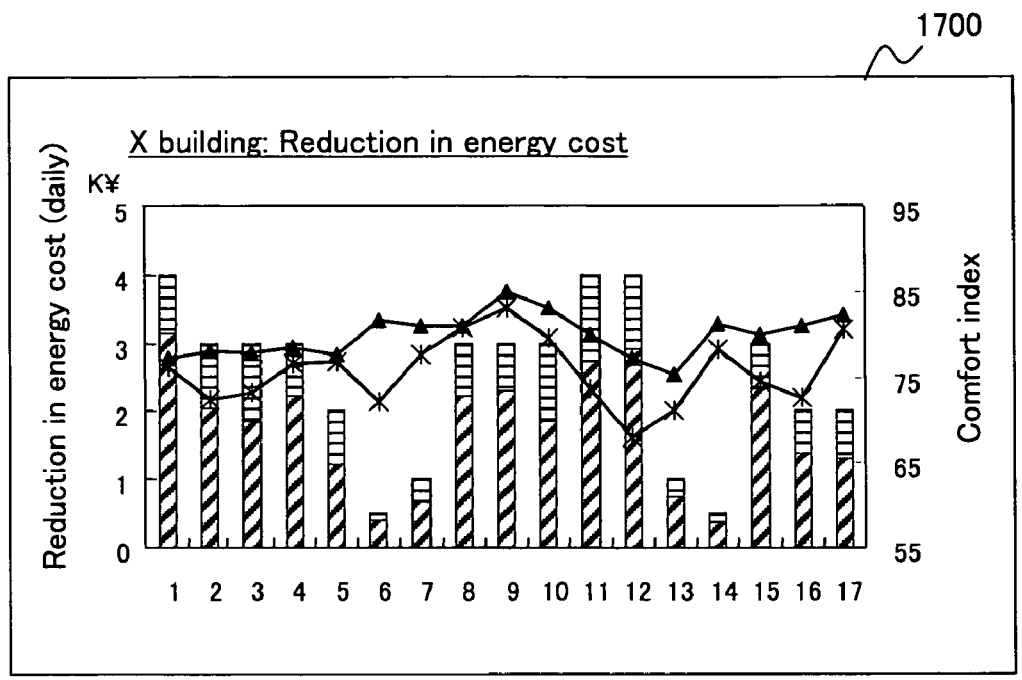
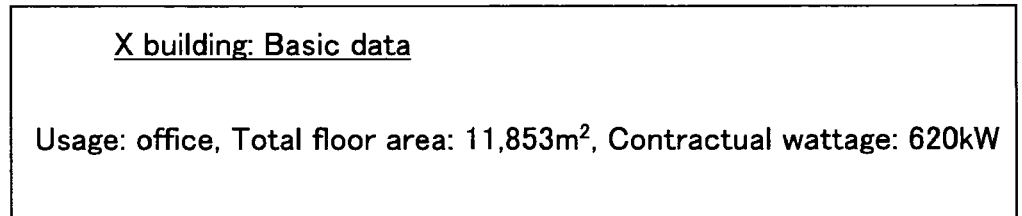
| | Searching conditions | |
|---|---|---|
| Usage | office | ▽ |
| Total floor area | 10,000~15,000 m2 | ▽ |
| Contractual wattage | 500~750 kW | ▽ |
| Region | Tokyo | ▽ |
Search
List of properties meeting the conditions
Two properties are found.
| Name | Reduction ratio (%) |
|---|---|
| X building | 15. 1 |
| Y building | 8. 2 |

METHOD, SYSTEM AND COMPUTER PROGRAM FOR MANAGING ENERGY CONSUMPTION

BACKGROUND OF THE INVENTION

The present invention relates to a method, a system and a computer program for managing the energy consumed by units of a facility such as a building based on an operational plan generated by the system.

Introduction of an energy management system into a building has been in great demand, which may result in a reduction in its energy consumption. However, most systems, which measure energy consumption and store it in order to graphically visualize it on a web such as an intranet, have not yet been so developed as to include automatic data analysis and controlling of the building. It has not been widely practiced to conduct external control for the units of a facility so as to reduce energy consumption, namely cost. Instead, it has been common that a person in charge of the facility manually controls them. Furthermore, because it requires experience and labor to analyze the data of the energy management system so as to make an appropriate adjustment for controlling of the units, unfortunately the system is often kept in operation without adjustment, under the initial setting being left as is. Therefore, it is anticipated that introduction of an automated data analysis and its application to controlling of a facility will contribute to a desired reduction in energy consumption and cost.

Japanese Published Patent Application 2002-258934 discloses a related art that the units of a facility is controlled so that a monthly bill for electricity may fall within a maximum cost required by a user.

However, it is not always practical to forcefully save the energy consumption in order that the bill may not exceed the required cost. The reasons for this are described as follows. There is a type of energy consumption which does not allow a reduction. Also it is sometimes necessary to evaluate a trade-off between amenity and cost. Therefore, when it comes to controlling a building, it is important to find a balance between amenity and cost. Furthermore, it is indispensable to prioritize reducing wasteful energy consumption so as to decrease consumption and cost of energy. I this way, it may be possible to minimize an adverse effect on the amenity. It is necessary to evaluate the balance between amenity and cost, taking into account a reduction in the wasteful energy consumption.

SUMMARY OF THE INVENTION

It is an aspect of the present invention to provide a system for managing energy consumption having a data storage module, a first calculation module and an operation planning module. The data storage module stores an operational past record of a unit belonging to a facility to be managed by the system. The first calculation module calculates wasteful energy consumption for the unit based on the operational past record stored in the data storage module. The operation planning module generates an operational plan for the unit belonging to the facility based on the wasteful energy consumption calculated by the first calculation module.

The system described above is able to provide the operational plan for a facility, by which the system can control the facility under a balance between amenity and cost as a result of prioritizing a reduction in wasteful energy consumption so as to efficiently decrease consumption and cost of energy.

BRIEF DESCRIPTION OF THE DRAWINGS

FIG. 5 is a schematic diagram illustrating an example of a screen for inputting a setting up for generating an operational plan.

FIG. 6 is a schematic diagram illustrating the relationship between energy cost and comfortable index.

FIG. 10 is a schematic diagram illustrating a method for determining a setting temperature in scheduling.

FIG. 11 is a schematic diagram illustrating a screen for control contents.

FIG. 12 is a schematic diagram illustrating results of operation of a facility.

FIG. 13 is a schematic diagram illustrating results of operation of a facility.

FIG. 15 is a schematic diagram illustrating an example of processing sensible environmental data.

FIG. 17 is a schematic diagram illustrating a screen, which is prepared for potential customers, depicting operational results of a building.

DESCRIPTION OF THE PREFERRED EMBODIMENTS

An embodiment of the present invention is now described with reference to the accompanying drawings.

Figure 1:
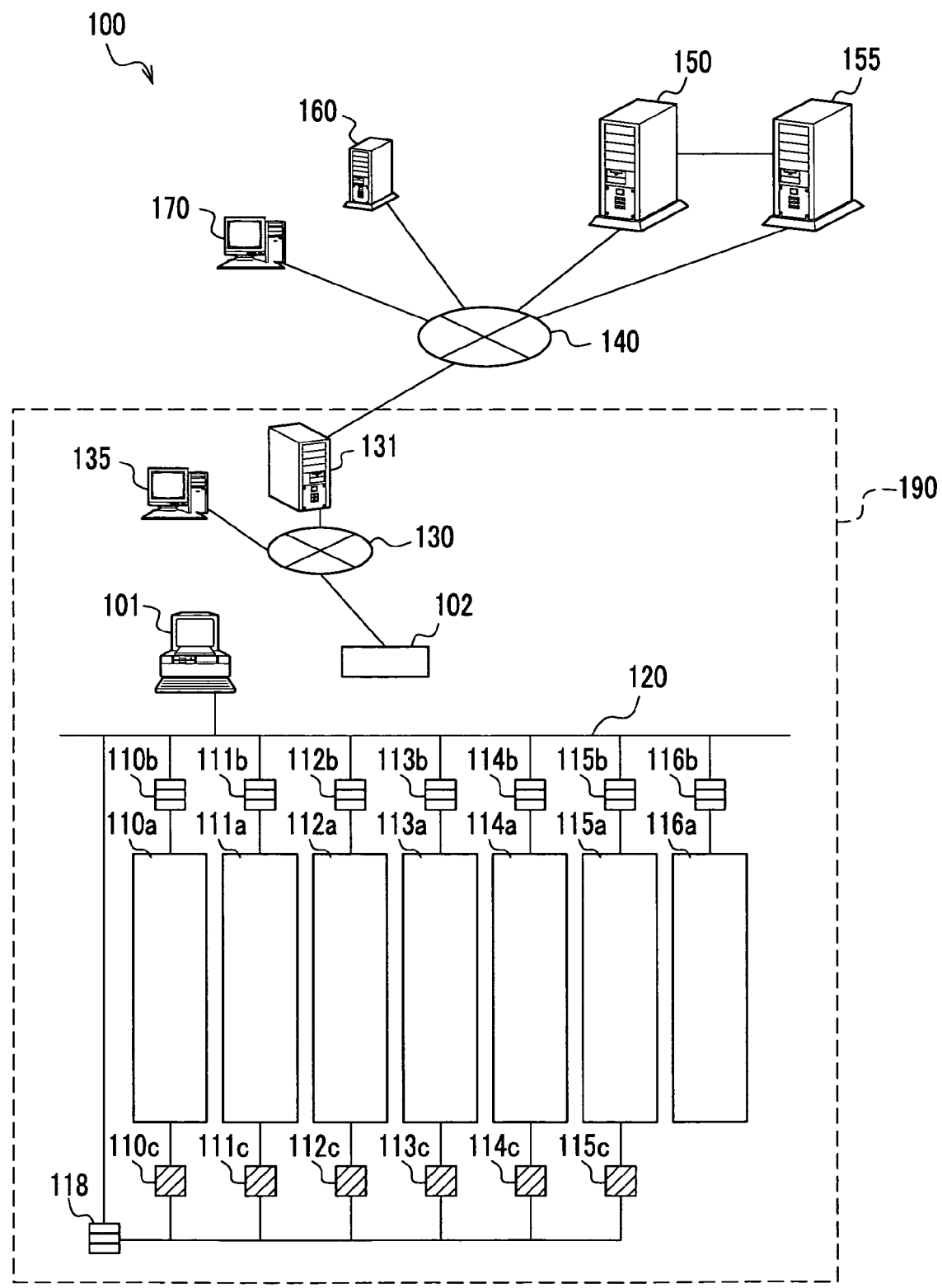
FIG. 1 is a schematic diagram illustrating structure of a system for managing energy consumption according to the present invention.

Description is given to an exemplary embodiment to which a system consistent with the present invention is applied. FIG. 1 is a schematic diagram illustrating the structure of a system for managing energy consumption. In a building 190, a Building Energy Management System (BEMS) center module 101 in charge of conducting energy management for the building 190 and a Building Automation (BA) server 102 are electrically connected to a BA communication line 120. The BEMS center module 101 not only gathers information on operation of units in the building 190 and their consumption of energy detected by field controllers 110b–116b so as to control the energy consumption, but also control the units in the building through the field controllers 110b–116b. The BA server 102, which gathers information detected by the filed controller 110b–116b as well as the BEMS center module 101, serves as a web server to transmit the information to an intranet 130 in the form of Hyper Text Markup Language (HTML). The BA server 102 also serves as a gateway between the intranet 130 and the BA communication line 120. On the other hand, an appliance 110a with a socket, a lighting system 111a, an air conditioning system 112a, a disaster prevention system 113a, a security system 114a, an elevator system 115a and an environment monitoring system 116a are electrically connected to the BA communication line 120 via the field controllers 110b–116b, respectively. Each of the appliance and systems 110a through 116a includes a plurality of types and pieces. When a command signal is sent by the BA server 102 to each of the field controllers 110b through 116b via the BA communication line 120, each of the appliance and systems 110a through 116a starts operation accordingly. Information on operation and detected data for each of the appliance and systems 110a through 116a are sent from the field controllers 110b through 116b to the BEMS center module 101 and the BA server 102 via the BA communication line 120. Energy consumption by each of the appliance and systems 110a through 116a is measured respectively, or it is grouped into a unit of floor or feeder in case of electricity and measured by energy measurement modules 110c–115c, and sent to the BEMS center module 101 and the BA server 102 via a field controller 118.

The intranet 130 is electrically connected to an internet 140 via a gateway 131. A remote control server 150, which is also electrically connected to the internet 140, is able to communicate with the BA server 102.

A service management server 155 is responsible for conducting management of service contents and bills in collaboration with the remote control server 150.

The remote control server 150 has several types of databases. The first one is a BA information database, which includes raw data such as energy consumption and operation of a unit, or post-conversion data obtained from the BA server 102.

The second one is a meteorological information database which stores information obtained from a meteorological information server 160 during a certain period of time.

The third one is a facility database which includes data associated with registered facilities of a building to be controlled. It includes the data for each facility such as an ID, a type (or a name for a peculiar facility), a location, a year-month-date of installation, a control method, a rated capacity, characteristics, a manufacturer, attachments, special notes, a covering area, a name of operation received from the BA server 102, a name of control information sent to the BA server 102, an ID of routine for generating an operational plan, and a control method (only direct control, only indirect control, automatic control and without control).

The fourth one is a receiving information database associated with information received from the BA server 102. It includes an ID of receiving information, a name of receiving information (name for operation of a unit received from the BA server 102 or a name for meteorological information received from the meteorological information server 160) and a number of data. In addition, sets of data field length, data type and classification of data are included according to the number of data.

The fifth one is a sending information database which stores information sent to the BA server 102. It includes an ID for type of sending information, a name of sending information (name of control information sending to the BA server 102) and a number of data. In addition, sets of data field length, data type and classification of data are included according to the number of data.

The sixth one is an energy saving control database associated with a routine of generating an operational plan. It includes an ID of routine for generating an operational plan, a name of routine for generating an operational plan (call address), a classification of input data, a classification of output data, a prioritized rank for processing and information about effect on amenity. The classification of input data selects information to be used in the routine for generating an operational plan from that stored in the facility database or the receiving information database. The classification of output data indicates a correlation between an output from the routine for generating an operational plan and control information sent to the BA server 102, accessing to the sending information database.

The seventh one is an area database, which is prepared for a facility. The area database relates to information on an area which the facility is in charge of controlling. In case of an air conditioning facility, for example, the information includes the following items per unit area for which calculation of heat load should be conducted: an area ID, a name of area, data for calculating heat load and a prioritized rank in terms of a time zone. Other than the air conditioning facility, such a facility as a lighting facility, which has a group of units that are collectively controlled, has information including an area ID, a name of area and a prioritized rank in terms of a time zone, in connection with a unit area which the group of units covers. The prioritized rank represents a degree of importance of operation of a facility in terms of a time zone. It may be possible to adopt a common index as the prioritized rank independent of an area. The covering area of the facility database described above corresponds to the area ID of the area database.

Contents of the service supplied by the system for managing energy consumption according to the present invention are twofold. A first one is to control facilities of a building so that an energy cost, for example a monthly cost, may not exceed a maximum value required by a customer. This type of control is hereinafter referred to as "cost index control". In this case, it is understood that how residents in the building feel comfortable is also taken into consideration because cost of energy and amenity should be traded off. This is particularly true of air conditioning. In this cost index control, requirements which include one of a lower limit for comfort index and an upper limit for discomfort index are introduced based on comfortableness which is predicted for the living environment of the building.

The customer includes an owner, a person in charge, a management association of a building, a person in charge of energy expenditure and a section of a real estate company in charge of buildings.

A second service is directed to controlling facilities of a building so as to meet an upper limit for discomfort index or a lower limit for comfort index. When this is carried out, a predicted energy cost or its reduction is provided for reference. The control described above is hereinafter referred to as "comfort index control".

According to the present embodiment, a comfort index (discomfort index) applied to an area is meant to represent a ratio of people in the area, who feel comfortable (uncomfortable). It may be possible to select other definitions for the index instead.

The cost index control has an advantage that it more appeals to customers because its merits for the customers can be clearly shown in the form of cost reduction. On the other hand, the cost index control has a disadvantage that a service provider may be potentially imposed on a contractual penalty when an upper limit for energy cost cannot be satisfied. The reason for this is that it is not always possible to meet the upper limit for energy cost or to achieve a better reduction in energy cost than a value required by a customer because of uncertainty intrinsic to use of energy. The cost index control implies difficulties in dealing with contractual responsibility when the upper limit for energy cost is not met, because it is generally difficult to tell to which party the failure should be charged. The reason for this is described as follows. It is possible to admit that the service provider is responsible for the failure when its cause can be attributed to units of a facility which can be controlled by the system according to the present invention via the BA server 102. However, it is difficult to know if other units, which are not under the direct control of the system, are operated in consistent with an operational plan that the system provides.

In contrast to the cost index control, the comfort index control is advantageous because it is easier to satisfy contents of service than the cost index control. This results from the fact that it is always possible to execute control, such as determination of setting temperatures based on indexes associated with comfortableness. Furthermore, although the cost index control is sometimes implemented with a margin relative to a lower limit for comfortable index, it is possible for the comfort index control to keep the lower limit. In this way, it is anticipated that a greater reduction in energy cost can be achieved by conducting the comfort index control than the cost index control.

In both types of control described above, the remote control server 150, which generates an operational plan for the units of a facility, directly controls those electrically connected to the BA server 102. Also the server 150 provides a person in charge of controlling a building with the operational plan, based on which other units not connected to the BA server 102 should be controlled. Because a process for generating an operational plan includes a large amount of information which is gathered from the BA server 102 and sent thereto, it requires a great amount of time. An automated process executed by a computer according to the present invention is able to decrease a period of time necessary for generating an operational plan to an acceptable level, thereby enabling a reduction in cost so as to bring the service on the market.

Figure 2:
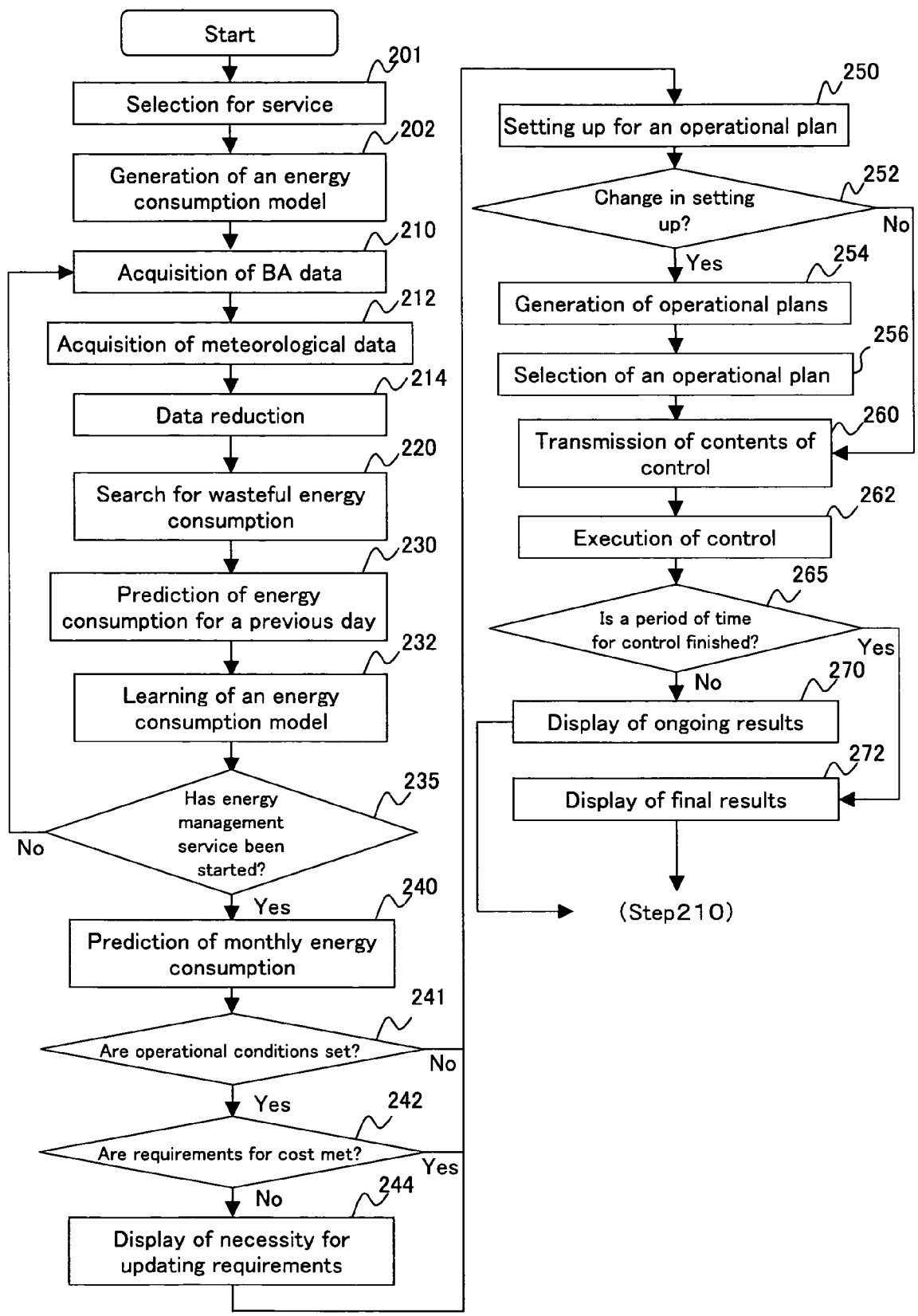
FIG. 2 is a flow chart illustrating steps for a method for managing energy consumption according to the present invention.

Detailed steps carried out by a system 100 for managing energy consumption according to the present invention is described below. FIG. 2 is a flow diagram showing the steps executed by the system 100. In case of the comfort index control which does not have requirements for energy cost, the system 100 controls units of a facility, keeping a comfort index as low as a lower limit (a discomfort index as high as an upper limit) for the comfortableness obtained by air conditioning.

In step 201, the service control server 155 provides an input page on which a selection for service is conducted. There are two methods for entering data, for example. The page is displayed on a web browser of a terminal 170, which is connected to the internet 140, in the form of World Wide Web (WWW), and a user enters data on the web browser. The other one is that the service provider uses a dedicated entering system so as to enter the data which is sent by the user in the form of documents. The items inputted are selection for cost index control or comfort index control and a service start time. The input data for setting communication with the BA server 102, such as a name of user, an ID, a name of building, an internet protocol address, may be inputted in advance by the service provider. When the input for the service has been completed, a process area for the building 190 is generated in the service control server 155 and the remote control server 150. In this way, the system 100 is prepared not only to generate a model for the building 190 in a following step 202 but also to store its operational past records. The data inputted in step 201 is referred to as "basic service data".

In step 202, the remote control server 150 generates an energy consumption model for the building 190 and executes initialization of parameters. For the energy consumption model, a neural network and a physical model are introduced according to facilities in the building 190 and input data. The neural network is provided for a day of the week and a time zone. The physical model is used for prediction of energy consumption, taking into account the characteristics of units based on the heat load imposed on air conditioners. It may be possible to prepare a calendar which categorizes days into predetermined daily patterns according to operational conditions of the building 190. And it may be possible to prepare an energy consumption model for each pattern or to use a pattern as an input for the energy consumption model.

There are two types of facilities in the building 190; one is controllable via the BA server 102 and the other is uncontrollable. However, the energy consumption model is configured to predict energy consumption for a facility as long as it receives the service, incorporating an operational plan generated by the remote control server 150. Although a statistical model and a neural network are able to introduce an operational plan as an input, a physical model is able to directly predict energy consumption with the operational plan. The service provider determines a time interval at which a prediction is conducted with an energy consumption model based on an interval at which the BA server 102 calculates energy consumption, and calculation capacity, communication capacity as well as memory capacity of the BA server 102 and the remote control server 150. It may be preferable to select an interval, such as 30 minutes or 1 hour, taking into account the fineness in terms of prediction of energy consumption for a time zone and an amount of data and calculation. The same method as that of entering data for the selection of service described in step 201 is used for inputting data in step 202. If there are the unknown in the required data, standard values are adopted. When a building model has been generated, preparation for generating an operational plan is completed.

In step 210, the remote control server 150 obtains recorded information on the operation of a unit, environmental measurement data and energy consumption data for electricity, gas, water, oil and the like from the BA server 102. The information about operation of a unit includes a history of setting temperatures, water temperatures at an inlet and an outlet of a heat exchanger and occurrence of malfunctions for a package air conditioner. An environmental measurement data includes temperatures, humidity and illumination of a room of the building 190.

In step 212, the remote control server 150 receives meteorological data from the meteorological information server 160. Data covering 2 a.m. on a previous day to 2 a.m. on a current day is prepared, which can be correlated with the data stored in the BA server 102. The meteorological data includes ambient temperatures, relative humidity, vertical quantities of total solar radiation, wind velocities and the like. The closest data in terms of the location of the building 190 is introduced and compensated for its altitude with a compensation table.

It may be possible that the remote control server 150 conducts reception and transmission of whole signals once a day or a group of data at a time a few times a day. In the present embodiment, a day for which the remote control server 150 generates an operational plan starts from 5 a.m. of a current day to 5 a.m. of a following day. In contrast to this, a day for which the remote control server 150 gathers an operational past record and a measurement starts from 2 a.m. of a current day to 2 a.m. of a following day. During the time period from 2 a.m. to 5 a.m., the remote control server 150 receives the whole data from the BA server 102 and the meteorological information server 160. This data, which is sent via the internet 140, is stored in a database of the remote control server 150. The remote control server 150 continues to store data received from the BA server 102 for a period of time, which is specified in a service contract and not less than that required for conducting prediction for energy consumption. On the other hand, the remote control server 150 continues to store data received from the meteorological information server 160 only for a period of time required for conducting prediction for energy consumption, and thereafter obtains data when it is necessary.

In step 214, the remote control server 150 conducts reduction for the data obtained in steps 210 and 212. It searches for abnormal values and eliminates them. The abnormal values do not represent true energy consumption or operation of units due to failure in measurement equipment and communication trouble. A plurality of methods for identification of an abnormal value is prepared. For example, it may be possible to adopt a method which executes comparison based on a normal range prepared in advance for a parameter, and another method which determines an abnormal value if it falls in not less than $|\mu \pm \alpha \sigma|$, where ν and σ represent an average and a deviation calculated from the history of data for a building, respectively, and α a coefficient. The remote control server 150 has a table which correlates a type of parameter and a method for determining an abnormal value and eliminates the abnormal value with a common routine for dealing with an abnormal value. Also, the remote control server 150 does not use data of a unit and measurement equipment for prediction of energy consumption, which are known to have experienced failure according to the operational status sent by the BA server 102. When the remote control server 150 can not obtain data due to failure of measurement equipment or data abnormality, it executes subsequent processes, neglecting the data until the recovery of data.

After elimination of abnormal values, the remote control server 150 executes an interpolation for lost data. Lagrange interpolation is an example for this. The remote control server 150 uses data, in which the abnormal values are eliminated and replaced with interpolated data.

After the interpolation for lost data, the remote control server 150 adjusts a time interval for data to meet that for an energy consumption model if it is necessary. For example, following two calculation methods are named. One method is that the data to be transformed is evenly divided into fractions in terms of a time interval which is smaller than that of the energy consumption model. Furthermore, if data is on a boundary in terms of time, the data is further divided into fractions so as to distribute them in proportion to time for two areas interposing the boundary. In this way, the data is adjusted for the time interval of the energy consumption model. The other method is that the remote control server 150 employs Hermite curve for interpolating a value between a pair of data, so that it conducts an integration with the time interval of the energy consumption model.

In step 220, the remote control server 150 searches energy consumption and operation of units for wasteful energy consumption. The wasteful energy consumption is meant to be energy consumption which does not affect the comfortableness felt by the residents of a building even if it is cut down.

Knowing wasteful energy consumption before generating an energy consumption model in step 232, it is possible to prevent degradation of prediction accuracy resulting from the use of a mixture of data before and after the reduction of wasteful energy consumption in the input data for the energy consumption model.

There are types and degrees for wasteful energy consumption. For example, leaving a lamp turned on is wasteful energy consumption, but turning on of a lighting device during overtime is not necessarily wasteful energy consumption. Therefore, the remote control server 150 simultaneously determines a type of wasteful energy consumption and its level, and stores them in a temporary storage area along with energy consumption.

The types of wasteful consumption and its levels are described below, for example. The types are categorized into: a. unpredicted work and overtime; b. malfunction and degradation of a unit; c. habitually excessive consumption. The levels are categorized into: 0. new demand; 1. additional judgment required to determine; 2. energy consumption with low necessity; 3. unnecessary energy consumption. "0" represents that a new demand occurs, being opposite to wasteful consumption.

Figure 4:
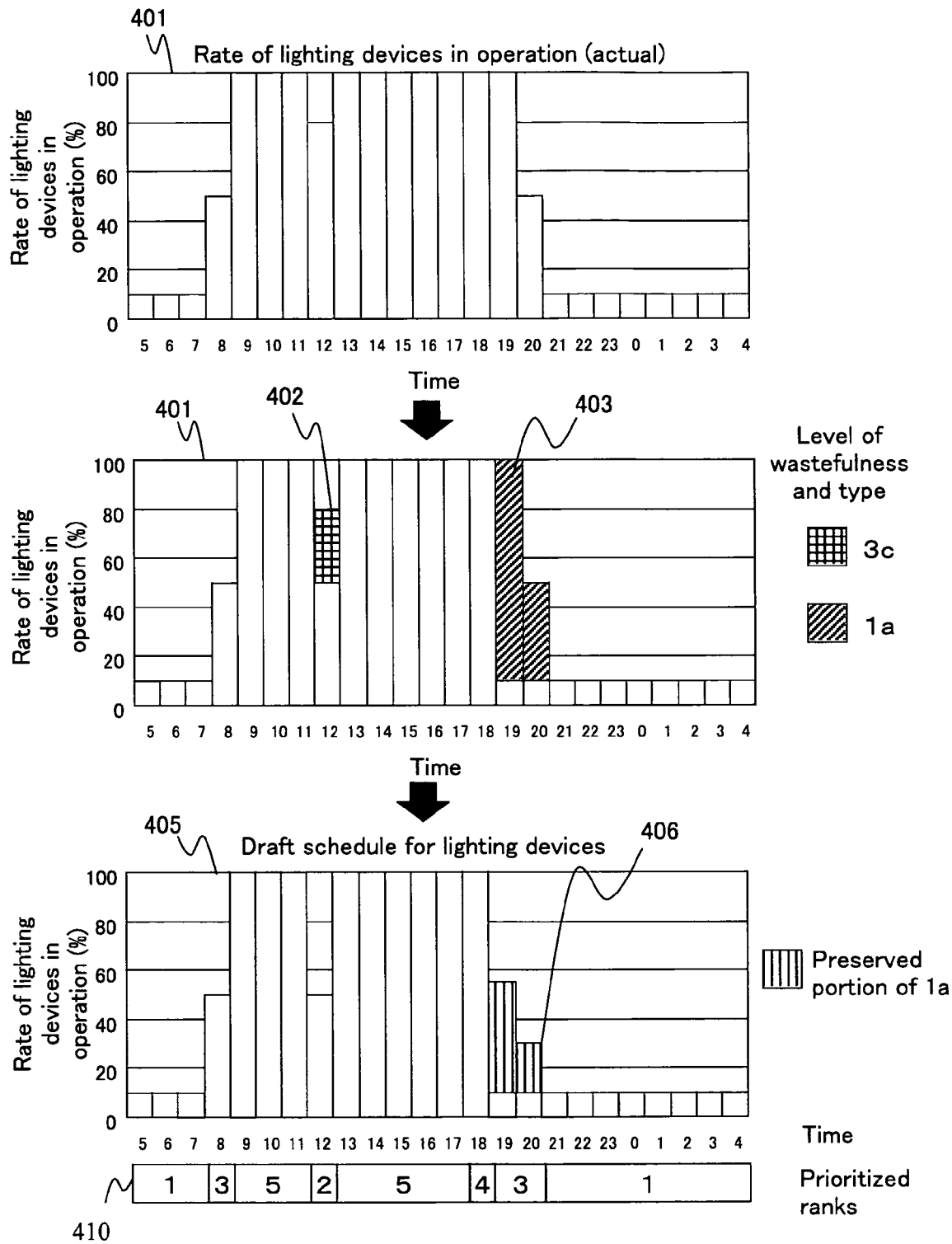
FIG. 4 is a schematic diagram illustrating an example of classification for wasteful energy consumption and a plan for cutting down.
Figure 7:
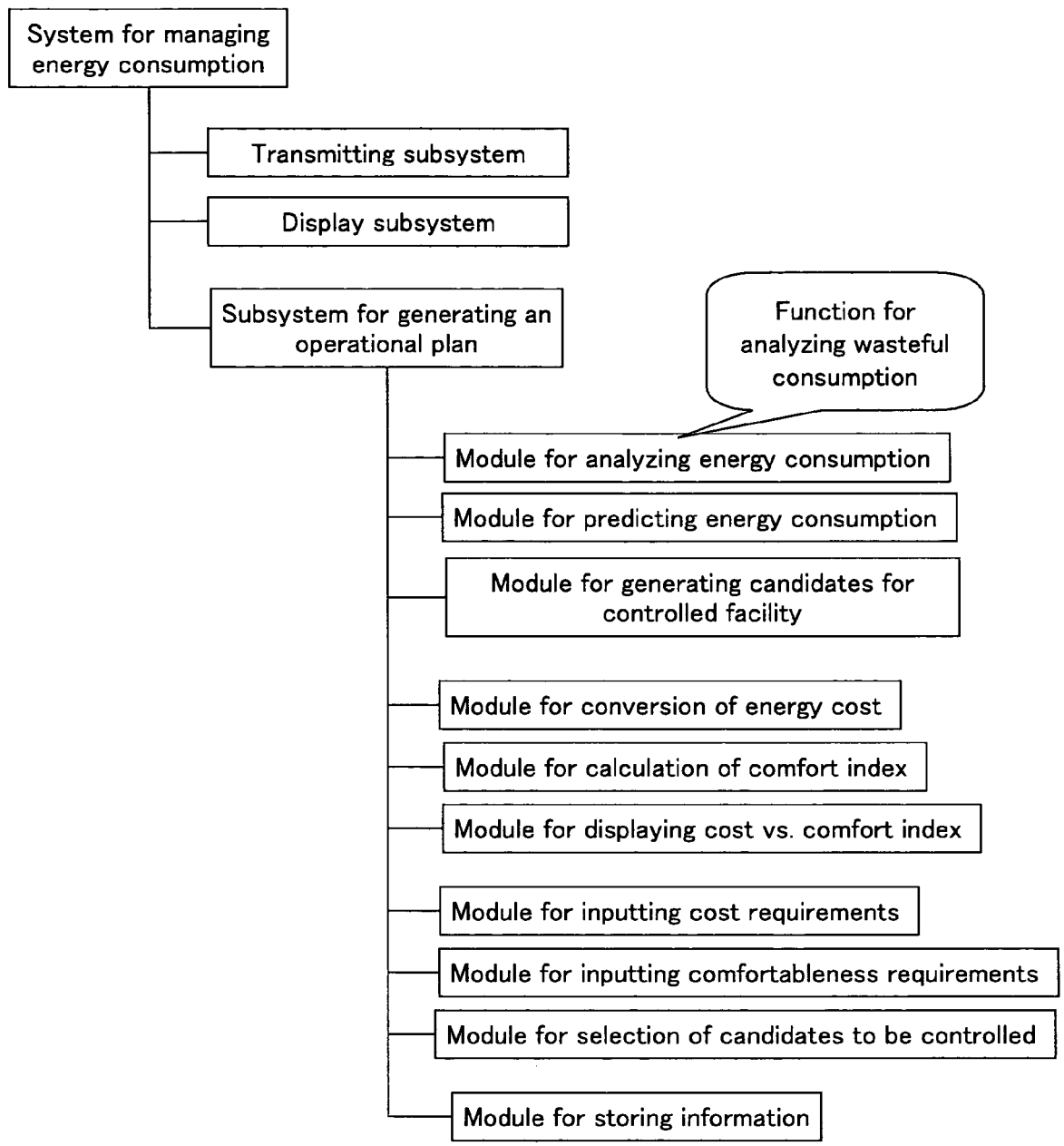
FIG. 7 is a schematic diagram illustrating structure of a system for managing energy consumption according to the present invention.

A diagram 401 in FIG. 4 shows measured ratios of lighting devices which are in operation for an area during one day. Referring to the diagram 401, three methods for determining wasteful energy consumption are described.

A first method is to check ratios of lighting devices in operation obtained from the BA server 102 or ratios obtained from rated capacities of units and consumption of electricity. The remote control server 150 determines that energy consumption by lighting devices is wasteful if it occurs after a predetermined time of the day, as shown by an element 403 in FIG. 4. It may be possible to introduce weighting according to daily time zones. Or another method may be selected, in which the remote control server 150 statistically calculates a distribution of time when a ratio of lighting devices in operation falls in a zero (0), excluding a ratio for security lighting devices. The server 150 determines that energy consumption by lighting devices is wasteful if it occurs after "an average time plus a deviation of time multiplied by a coefficient". The level and type of wasteful consumption determined by this first method is classified as "1a".

A second method is to register a combination of area and time in which a lighting device can be turned off, such as an office during lunch time, in the remote control server 150, which determines that energy consumption by lighting devices is wasteful if a ratio of lighting devices in operation exceeds a threshold. The level and type of wasteful consumption determined by the second method is classified as "3c", and stored in the temporary storage area of the server 150. The server 150 determines that energy consumption is wasteful if the ratio is more than 50% during lunchtime 1200 to 1300 hours as shown by an element 402 in FIG. 4.

A third method is to compare a ratio of lighting devices in operation for an office with another ratio of information equipment in operation such as personal computers (PC's) which are used in an office. It is possible to determine that energy consumption is wasteful for an area where the lighting devices are on while PC's are not in operation. Because employees potentially remain in the office even if the PC's are not being operated, the remote control server 150 has a memory area for registering data, based on which the server 150 determines whether or not the lighting devices may be turned off after a predetermined time has elapsed. An employee uses a terminal 135 electrically connected to the intranet 130 to access a portal site with WWW so that he can input a waiting time during which a lighting device is kept on after turning off of a PC. The server 150 establishes a correlation between the employee and an area, which is a unit for executing control, based on his ID and his work place. Alternatively, it may be possible to install a computer program in a PC so that the server 150 can gather information about operation of the PC. In this way, an employee may register a waiting time and his area. The remote control server 150 selects the shortest and positive time out of the data employees enter. If there is at least one level zero (0) or "no turning off" which an employee has entered, the remote control server 150 will not turn off lighting devices. Wasteful energy consumption determined by the third method is classified as "3c". If the first and third methods overlap with each other, a priority is given to the third method.

It will be a first step to save energy if wasteful consumption of energy is found out. Because it is possible to lessen a reduction in the comfortableness of residents of a building if wasteful energy consumption is prioritized to cut down, it is important to find out the wasteful energy consumption.

It is possible to determine an operational time zone for an air conditioner in the similar manner as that of a lighting device. Suppose a setting temperature is lower in cooling or higher in heating than a standard setting temperature, for example 26 degrees Celsius in cooling or 22 degrees Celsius in heating. It may be possible to determine that an energy consumption, which exceeds a predicted amount under the standard setting temperature, is wasteful regardless of comfortableness and regarded as a candidate for reduction. In steps 201 and 250, a user is provided with opportunity for inputting selection for this determination and control.

In step 230, the remote control server 150 executes a prediction for energy consumption for a previous day (2 a.m. of a previous day to 2 a.m. of a current day) with an energy consumption model based on meteorological data and actual data of operation of units. In step 232, the server 150 learns an energy consumption model based upon an error of prediction calculated in step 210 relative to measured energy consumption data obtained from the BA server 102. Methods for learning are described for two examples. When a neutral network is used, a back propagation is conducted with introduction of this error as a teacher signal. In contrast to this, when a physical model is selected, an average calculated from ratios of this error to a predicted value is introduced as a compensatory coefficient in connection with a day of the week and a time zone.

Separate models are prepared for a case where reduction in wasteful energy consumption is carried out and for the other case where it is not done. And actual results of energy consumption excluding wasteful energy consumption, which has been determined in step 220, are employed in learning a model, when the reduction is conducted.

The remote control server 150 starts implementation of energy management service after it has conducted learning of parameters over a period of time, for example one month. If the energy management service has not been started in step 235, the flow returns to step 210. If learning of parameters has been finished for a predetermined period of time and the energy management service has been started, the flow proceeds to step 240.

In step 240, the remote control server 150 receives meteorological prediction data from the meteorological information server 160 for a following period of time for service, namely for a following one month. The server 150 predicts energy consumption and cost for the following month, under a plurality of conditions such as a standard operation and an operation with the same upper limit for cost and the same lower limit for comfortable index as those of the previous month. The resent embodiment adopts a period of one month starting on the first day and ending on the last day of a month, as an example.

If an operational condition for a current month has been established in step 241, the flow proceeds to step 250. Otherwise, it proceeds to step 242.

In step 242, the remote control server 150 determines whether or not a predicted energy cost falls within an upper limit and a target reduction in an energy cost can be achieved. If the server 150 provides satisfactory results, the flow proceeds to step 250. Otherwise, it proceeds to step 244.

In step 244, the remote control server 150 notifies a user with a display that the upper limit or the target reduction in the energy cost may not be achieved. Alternatively, it may be possible to notify the user that updating is necessary for the upper limit for energy cost or the upper limit for discomfort index.

In step 250, the remote control server 150 conducts setting up for generating an operational plan for a following month. The service control server 155 provides the terminal 170 of a user with a setting page as a WWW site via the internet 140. The service control server 155 can recognize a user with a service ID and a password by which the user logs in. When the number of buildings is one, which the user registers so as to receive the service, the service control server 155 can directly identify a building based on the basic service data. When the number is two or more, the server 155 provide the user with another page, on which selection of building can be carried out. Subsequently, the server 155 displays whether or not setting up is completed for all the buildings. When the user has finished setting up and logged off, the server 155 displays an alarm and a question if the user desires to conduct setting up again. If setting up has been completed for all the buildings registered by the user, it may be possible to skip step 250 or to conduct only confirmation.

FIG. 5 is an example of page which is provided to a user when he conducts setting up for an operational plan. Description is given of a case where cost index control is selected as an example.

A diagram 501 shows a past record and a prediction for a following operational period of time (a following month or a remaining period of time for a current month). An element 510 represents an actual cost for a month. When a prediction of energy cost for the following month is made, predicted values for the current month are introduced as input. Elements 512, 514 and 516 represent predicted costs for the following month. The element 512 is representative of a normal operation, the element 514 is for an operation where control with the same setting up as that of the current month is conducted and the element 516 is for an operation where control is conducted according to setting up for the following month inputted by the user. It may be possible to indicate a cost for each kind of energy, introducing an accumulated bar graph.

In this connection, "the same setting up as that of the current month" is meant to include the following. The lower limit for comfort index (or the upper limit for discomfort index) is the same as that of the current month as minimum. In addition, the ratio of the upper limit for energy cost to an energy cost during normal operation is the same as that of the current month. A level for reduction in wasteful consumption, which is to be described later, is the same as that of the current month.

Because items which are set up for an operational plan include as minimum requirements for energy cost and comfortableness, the remote control server 150 provides a user with a functionality of inputting these requirements. An upper limit or a target reduction in energy cost is inputted for the former. On the other hand, a lower limit for comfortable index or an upper limit for discomfort index is inputted for the latter. As shown in FIG. 5, an input slot 530 for upper limit for energy cost and an input slot 535 for lower limit for comfort index are prepared.

Diagram 550 shows the relationship between energy cost and comfortable index. A curve 551 represents a predicted energy cost while a lower limit for comfortable index is assumed. The horizontal axis represents comfort index and the vertical axis represents predicted energy cost. The predicted energy cost is adapted to be maximal for a normal operation. The lower limit for comfort index is adapted to be not less than a predetermined value so that comfortableness can not be excessively degraded. It may be possible that a service provider selects an allowable level for degrading comfortableness in advance, or a user inputs it instead.

An area 553 in the diagram 550 represents where the comfort index meets the lower limit inputted in an input slot 540.

A bar 553 represents an upper limit for energy cost which is consistent with that inputted in the input slot 530. A dotted line 555 represents a comfort index correlated with the upper limit for energy cost, and the value is also shown in a display slot 545. When a user presses a button 537, the lower limit for comfort index in the input slot 540 is set to be the same as that in a display slot 535. When the user presses a button 547, the upper limit for energy cost is set to be the same as that in the display slot 545.

A bar 557 represents the lower limit for comfortableness shown in the input slot 540. A dotted line 558 represents a predicted energy cost that meets the lower limit for comfort index, which is shown in the display slot 535. This predicted energy cost is obtained under the conditions that wasteful energy consumption is controlled so as to achieve a maximum reduction for lighting devices and the like, and energy consumption is cut for air conditioners and the like by introducing the lower limit for comfort index.

It is possible to move the bar 554 and the bar 557. The bars 554 and 557 can be moved by not only directly accessing them but also handling buttons 556a, 556b, 559a and 559b. The bar 554 can be moved upward and downward by the buttons 556a and 556b, respectively. The bar 557 can be moved right and left by the buttons 559a and 559b, respectively. In this connection, the upper limit for energy cost in the input slot 530 varies according to the movement of the bar 554. Similarly, the lower limit for comfortable index in the input slot 540 varies according to the movement of the bar 557.

Because the upper limit for energy cost falls within the area as shown in FIG. 5 which meets the lower limit for comfort index, a point 552 specifies conditions for generating an operational plan.

A departure from a predicted relationship between a reduction in energy cost and comfortableness occurs in implementing the system for managing energy consumption according to the present invention. This is attributed to an unexpected variation of environmental conditions such as weather and errors in an energy consumption model. As a result, it may sometimes happen that control is conducted, having a margin relative to a lower limit for comfort index. When a user sets a target reduction in energy cost keeping a margin for comfort index, it is likely that a laxer control is implemented. When the user checks a check box 595 to select control prioritizing cost reduction, the remote control server 150 executes control, which reduces energy cost by controlling air conditioners to a lower limit for comfortable index. Even though a predicted monthly energy cost is less than the upper limit at the end of a month (an operational period of time) or an actual daily cost is less than the upper limit defined for a day, which is determined based on an accumulated energy cost for an operational period of time, the remote control server 150 conducts control as described above during a time zone having a margin for comfortable index. This control is hereinafter referred to as "cost reduction prioritized option".

For a user who does not want to sacrifice comfortableness as long as a target reduction in energy cost can be met, he is able to receive his desired service if he cancels the cost reduction prioritized option.

When a service fee is contractually set according to a relative reduction, which is defined as a reduction in energy cost relative to that resulting from conducting a normal operation, it is possible for a user to lower the service fee by using the cost reduction prioritized option. The reason for this is that the user can determine a target reduction in energy cost while he keeps a margin for comfortable index. On the other hand, when weather permits reducing a margin for comfortable index, it is possible to expect more reduction in the energy cost by lowering the comfort index. Looking at the operation described above from the viewpoint of a service provider, the remote control server 150 may have a better chance to succeed in achieving the target reduction in energy cost, which becomes smaller than that of a case where the low limit for comfortable index is selected. In this connection, if a service provider allows a user to select the cost reduction prioritized option if only the user sets a target reduction in energy cost which is not less than a certain ratio relative to that obtained by implementing control with a low limit for comfortable index, it is possible to prevent the user from unreasonably reducing a service fee by setting an excessively small value or zero for the target reduction in energy cost. Alternatively, it may be possible to provide the cost reduction prioritized option with an optional fee so as to increase an anticipated profit.

A met-hod for showing the relationship between energy cost and comfortable index, which is different from that of the diagram 550, is described with reference to FIG. 6.

As shown in a diagram 600, the vertical axis represents a predicted reduction in energy cost and the horizontal axis represents a discomfort index. Numerals 601–608 are counterparts of numerals 551–558, respectively. The input slot 530 for upper limit for energy cost is replaced with an input slot 610 for target reduction in energy cost, and the input slot 540 for lower limit for comfortable index is replaced with an input slot 620 for upper limit for discomfort index. A discomfort index correlated with a target reduction in energy cost shown in the input slot 610 is displayed in a display slot 615, and a predicted reduction in energy cost correlated with an upper limit for discomfort index is displayed in a display slot 625. The predicted reduction in energy cost shown in the display slot 625 is the same as the maximum feasible reduction in energy cost which occurs when the value in the input slot 620 is selected for the upper limit for discomfort index.

A diagram 650 depicts the relationship between energy cost and comfortable index, taking into account effects of reduction in wasteful consumption, when wasteful consumption is prioritized to cut down. Numerals 651–658 are counterparts for numerals 551–558, and numerals 660–675 are counterparts for numerals 530–545. An area 680 represents a reduction in energy cost relative to the energy cost of a normal operation when a reduction in energy consumption is conducted.

It may be possible to limit the energy cost to those of units which participate in controlling of comfortableness, such as air conditioners. Although the relationship between energy cost and comfortable index is depicted by a curve as shown in FIG. 5 and the relationship between energy cost and discomfort index is depicted by a curve as shown in FIG. 6, respectively, it may be alternatively possible to use energy cost versus comfort index and reduction in energy cost versus discomfort index in the form of bars at some selected points.

In addition to energy costs, it may be possible to provide discharged greenhouse gas in volume such as $CO_2$. In this case it may be possible to select an upper limit for discharged $CO_2$ instead of an upper limit for cost. Furthermore, it may be possible to select a method which imposes an upper limit for a total cost including an energy cost and a charge for the right to emit $CO_2$ while the remote control server 150 automatically calculates the charge based on a monthly average value on a market during the previous month. In this connection a discharged amount of $CO_2$ is calculated by introducing a conversion coefficient. The remote control server 150 calculates the amount by multiplying energy consumption by the conversion coefficient. The right to emit $CO_2$ which needs to be bought is calculated by subtracting the volume of $CO_2$ that is covered by the currently owned right from the predicted volume of $CO_2$. The volume of $CO_2$ which is covered by the owned right is stored in a building database 710.

As shown in FIG. 5, a selection box 590 allows a user to select one of cost index control and comfort index control. When comfort index control is selected, the input slot 530 for upper limit for energy cost and the check box 595 are adapted to be invalid. The predicted energy cost and the predicted reduction in energy cost are displayed as reference values.

An effect brought by a reduction in peak power is taken into consideration for electricity. This is achieved not only by demand control but also by an operational plan. It is possible to generate the operational plan for a reduction in base charge brought by a peak power reduction, which is dealt with independent of a target reduction in energy cost like a cost reduction due to cutting of wasteful energy consumption. The reduction in base charge is evaluated by comparison with an expenditure paid before introduction of the remote control service, or by comparison of a cost for a contract demand predicted for energy consumption without the service. The contract demand is determined from the maximum peak power during a year multiplied by a coefficient for margin. It may be preferable to select the former approach during the first one year after introducing the energy management service and use the latter approach afterward, because some buildings may require an increase in contract demand if they do not receive the service.

Searching for a month which has a yearly peak power is described. It is possible to nominate a month for the month of peak power if it has maximum power consumption during a past one year. Also, it is possible to search for a month of peak power by analysis with an energy consumption model which has already learned about buildings to receive the energy management service. A standard meteorological data is applied to this energy consumption data. In this connection, it is not necessary to conduct prediction for all the days throughout a year, but it may be possible to select particular days in summertime and wintertime for which prediction is carried out, when they experience severe weather conditions.

In step 252, when a change is inputted in step 250 such as new setting up and change of setting up from default, the flow moves to step 254. Otherwise, the flow moves to step 260.

In step 254, the service control server 155 transmits the setting up inputted in step 250 as well as ID's of buildings to the remote control sever 150. The server 150 stores the setting up in a memory area assigned for a building and generates a plurality of operational plans.

Figure 3:
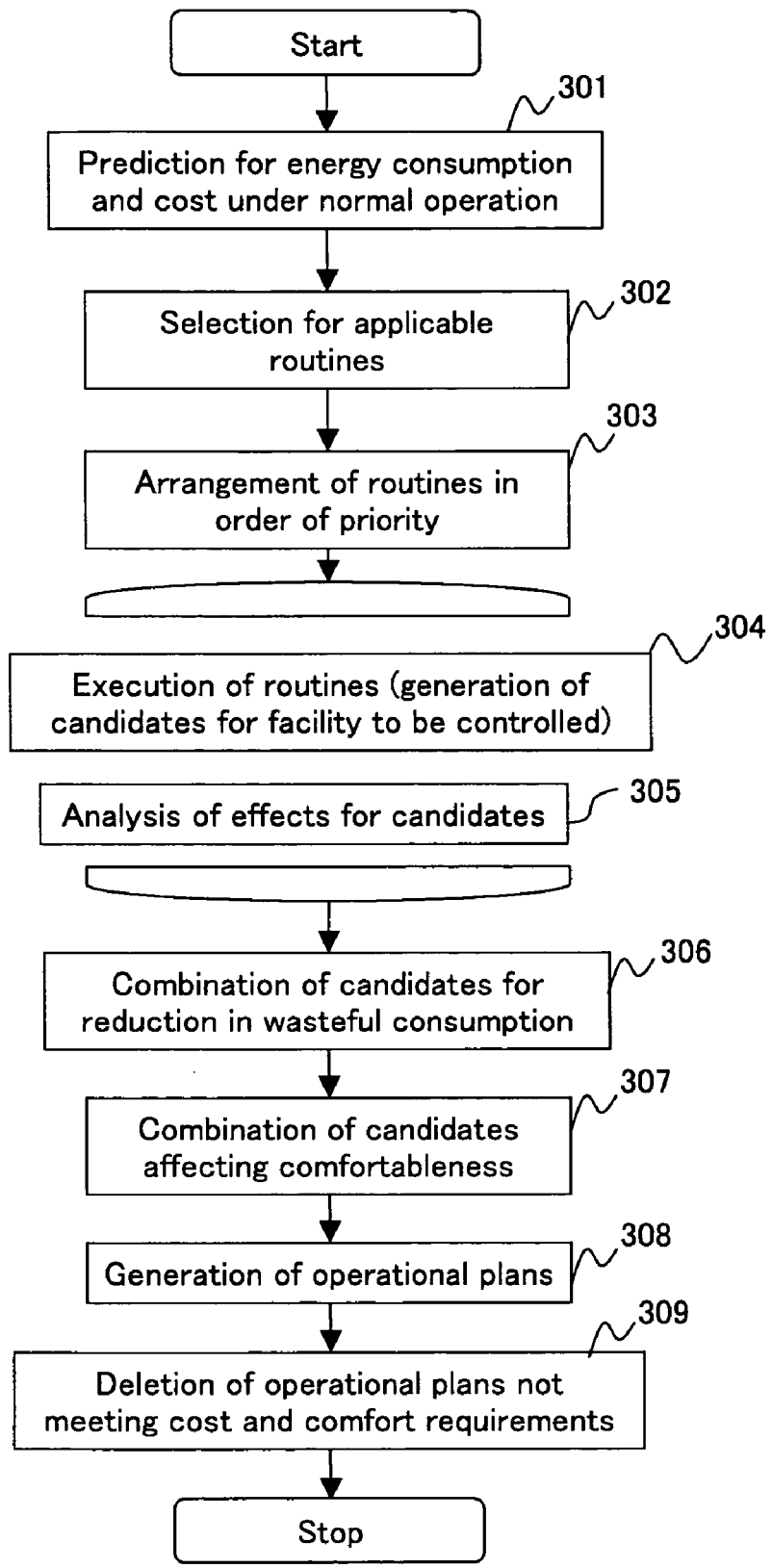
FIG. 3 is a flow chart illustrating steps for generating an operational plan according to the present invention.

FIG. 3 is a flowchart illustrating a flow for generation of an operation plan. It should be noted that the flow is an all-purpose flow and the present invention is not limited to it when each building has its own method for generating an operational plan.

The remote control server 150 has a plurality of routines for generating an operational plan. A routine for generating an operational plan adapts control, which is applied to a unit, so that the unit is controlled so as to save energy compared with a normal operation. Each routine has an ID. If input and output is common for two or more buildings, a routine can be shared among these buildings. There is a routine which is able to generate a plurality of operational plans, such as a routine for reduction in wasteful energy consumption to be described later.

In step 301, the remote control server 150 executes a prediction for energy consumption and its cost as preprocess on the assumption that a normal operation is conducted. In this case, the prediction is conducted with an energy consumption model and a table for cost conversion, assuming that controllable lighting devices are operated in a conventional manner, controllable air conditioners are operated according to a normal setting and uncontrolled units are operated without setting.

In step 302, the remote control server 150 selects control which is applied to a building to receive the energy management service. The applicable control varies according to Building Automation (BA) and facilities. Even if expected behavior of a unit is the same, types of control are different, such as indirect control which requires participation of a person in charge of the building and residents who manually conduct operation and setting, and direct control via the BA server 102.

Selection for applicable routines for a building results in selection of routines, which provide control required by facilities belonging to the building, from a group of routines for generating an operational plan. The remote control sever 150 obtains a routine for generating an operational plan to be processed in the following sequence: the remote control server 150 selects an ID for the routine for generating an operational plan for a facility of the building from the building database 710, retrieving a name (call address) for the routine for generating an operational plan correlated with the ID in an energy saving control database 740. When a common routine is applied to two or more facilities of the building, it is necessary to retrieve so as not to repeat the process, because it is enough to execute the routine only once.

In step 303, the remote control server 150 arranges selected routines for generating an operational plan in order of priority in terms of processing according to the energy saving control database 740. In step 304, the remote control server 150 executes each routine according to the order. A retrieved routine for generating an operation plan accesses a classification of input data registered in the energy saving control database 740. Subsequently, retrieving an energy consumption record database as well as the building database 710 which are located in the remote control server 150, the routine arranges input and generates candidates for facility to be controlled.

In step 305, the remote control server 150 quantitatively analyzes effect of each candidate on energy cost and comfortableness.

The remote control server 150 predicts energy cost when each candidate is carried out. It may be possible to assume normal operational conditions in the prediction except for control items associated with the candidates.

The remote control server 150 subtracts the predicted energy cost described above from a predicted energy cost under normal operation, which is interpreted as an approximate reduction in energy cost brought by a candidate. The server 150 stores a pair of energy cost reduction and the candidate in a temporary storage area.

In addition, a routine for generating an operational plan, which has an effect on comfortableness, calculates one of comfort index and discomfort index and stores it.

In steps 306–308, the remote control server 150 determines combinations of candidates as a draft operational plan. A combination is determined so that such control is prioritized, which is classified as having no effect on comfortableness in the energy saving database 740. In other words, priority is given to the control which leads to a reduction in wasteful consumption.

It is assumed that there are n pieces of routine for generating an operational plan which generate candidates for facility to be controlled so as to reduce wasteful energy consumption and each routine generates $N_i$ (i=1-n) classifications of candidates. Also, it is assumed that there are m pieces of routine for generating an operational plan which generate candidates so as to reduce energy consumption according to a tradeoff in terms of cost and comfortableness and each routine generates $M_j$ (j=1-m) classifications of candidates.

In step 306, the remote control server 150 takes out the candidates one by one from the routines for generating an operational plan, thereby generating combinations out of candidates of n. The number of combinations results in $N_1 \times N_2 \times \ldots N_n$.

In step 307, the remote control server 150 takes out candidates one by one from the routines for generating an operational plan having an effect on comfortableness, thereby generating combinations out of candidates of r (r=0 to m). The number of combinations results in $_mC_1 \times _mC_2 \times \ldots _mC_m$, where $mCr=m!/(m-r)!r!$.

In step 308, the remote control server 150 determines combinations of the candidates for reduction in wasteful consumption and the candidates having effect on comfortableness so as to generate an operational plan. If the number of combinations is too large, it may be possible to reduce the number by selecting candidates, which may greatly contribute to energy saving, in the middle of calculation.

In step 309, the remote control server 150 deletes operational plans which do not meet cost and comfort requirements. In case of cost index control, an operational plan which produces a cost reduction that meets a target cost reduction is selected as a candidate to be carried out. On the other hand, in case of comfort index control, an operational plan is selected as a candidate, which does not include candidates for facility to be controlled that allow a comfort index to be less than a lower limit, or allow a discomfort index to be more than an upper limit. Furthermore, it may be possible to generate only candidates which meet requirements for comfortableness, using a routine for generating an operational plan.

A maximum feasible reduction in energy cost is equal to a reduction in energy cost which is predicted based on an operational plan that reduces wasteful energy consumption by 100% and controls the comfortable index to a lower limit. In this connection, the 100% reduction includes some tens percent of reduction in energy cost for indirectly controlled units.

An example of routines for generating an operational plan is described below, showing scheduling for turning on and off of lighting devices and setting of temperatures for air conditioners.

First, description is given to scheduling for lighting devices below. It is assumed that light equipment is fluorescent lights which are adjustable in terms of output by manual handling and remote control and have control devices that allow the fluorescent lights to select one of control modes such as manual handling, remote control and a hybrid in which manual handling is prioritized by request for a certain period of time. A typical case is selected for the following description, where manual handling is selected now, and from a following month on, scheduling is conducted for cost reduction by introducing remote control as a base control method.

Figure 8:
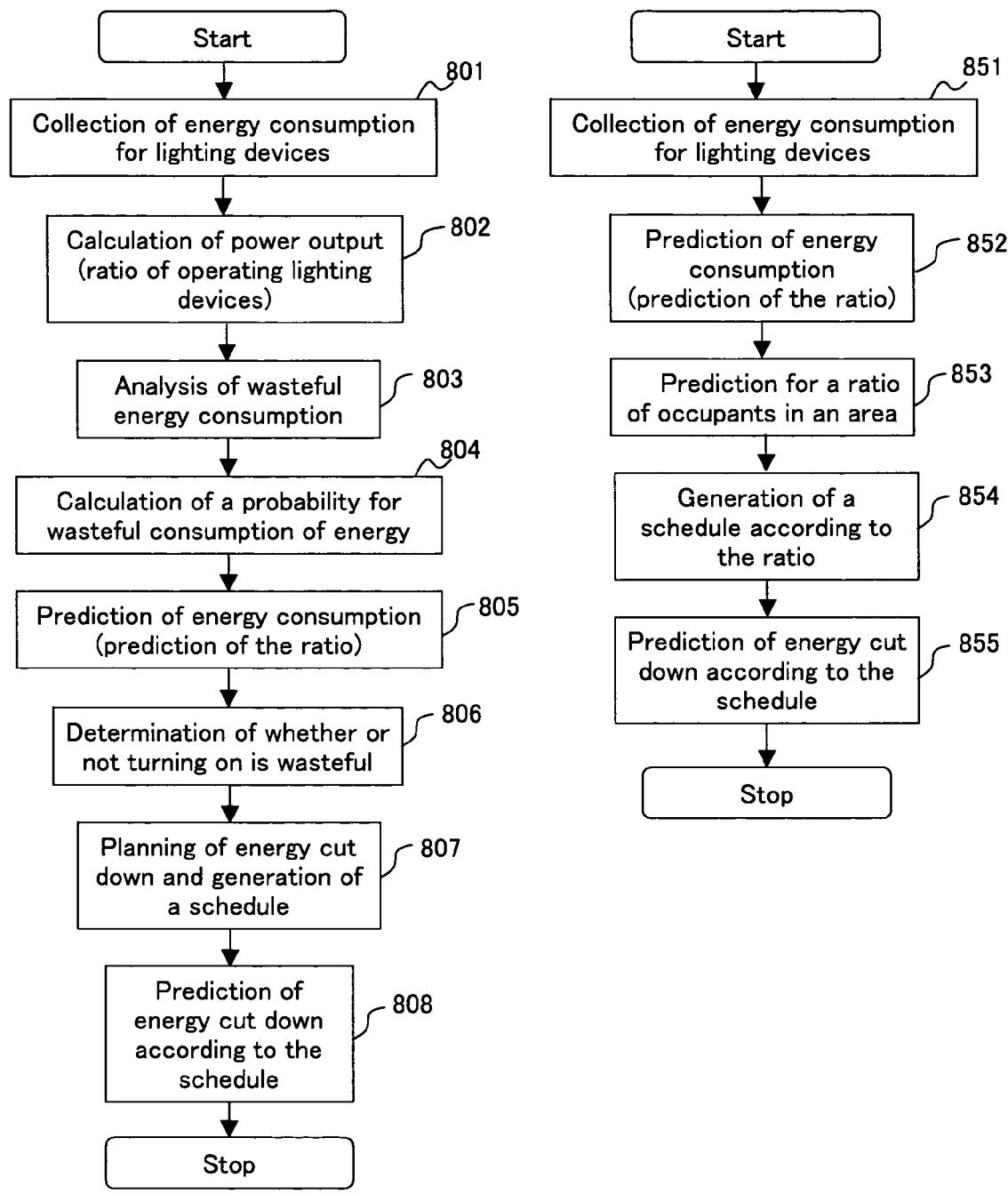
FIG. 8 is a flow chart showing steps for scheduling for lighting devices.

FIG. 8 is flowchart illustrating a flow for generating scheduling of lighting devices. The remote control server 150 executes all processes for scheduling. In step 801, the server 150 gathers energy consumption such as consumed electric power for lighting devices. In step 802, the server 150 calculates an output (ratio of operating lighting devices) relative to the capacity of a facility which supplies them with electricity. If this data is available in the BA server 102, the server 150 may use it instead.

In step 803, the server 150 analyzes wasteful energy consumption for the lighting devices. Processes executed in step 803 are the same as those in step 210.

In step 804, the remote control server 150 calculates a probability for wasteful consumption of energy when there are lighting devices which are on. The probability is defined by a ratio, a number of occurrences to a number of all possible outcomes. It may be possible to independently calculate the probability according to classified working days and time zones.

In step 805, assuming current conditions of manual handling, the remote control server 150 executes a time-sequential prediction to obtain energy consumption (output) for a future period of time (a following month, for example).

In step 806, when turning on of a light device is anticipated, the remote control server 150 determines whether or not this turning on is wasteful based on the probability calculated in step 804. For example, a criterion that it is wasteful if the probability exceeds a threshold is applied to the determination.

In step 807, the remote control server 150 determines when and how much wasteful turning on should be cut down, thereby generating a schedule for lighting devices.

In step 808, the remote control server 150 predicts energy consumption (output) when the lighting devices are controlled according to the schedule. Comparing with a prediction obtained in step 805 for the current conditions, the server 150 then calculates how much energy consumption and cost can be reduced.

As shown in another flow in FIG. 8, the remote control server 150 gathers energy consumption of lighting devices in step 851 like step 801. In step 852, assuming current conditions of manual handling, the server 150 predicts energy consumption like step 805. In step 853, the server 150 predicts a ratio of occupants in an area where the lighting devices are located for a future time period. A ratio of operating PC, a man detecting sensor and the like are used in order to obtain input data for prediction of the ratio of occupants. As a model for predicting the ratio it is possible to use a statistical model such as an Auto-Regressive Moving Average (ARMA) and a neural network which is able to learn by back propagation. In step 854, the server 150 generates a schedule for the lighting devices according to the predicted ratio of occupants. It may be possible to implement scheduling by introducing a criterion that the lighting devices are turned on if at least one person is in an area, or by preparing a table that supplies power output of lighting devices which is correlated with the ratio of occupants in a room. In step 855, the server 150 calculates efficiency of saving energy brought by scheduling for the lighting devices like step 808.

When lighting devices are controlled according to a schedule, an energy consumption model, which is represented by power consumption and a schedule, can be used. When energy consumption is predicted for a following month on the assumption that the lighting devices are turned on and off only by manual handling, an ARMA can be adopted. Energy consumption for a following day is predicted based on data which was measured over previous several days and whose measurement time is same as that of a prediction. When measurable energy consumption includes that of OA equipment in addition to the lighting devices, it may be possible to adopt a combination of both methods described above.

It would be a large amount of calculation to conduct a prediction for each day of the following month. It should be understood that it is not meaningful to provide a prediction for each day if we assume that an operational pattern of a lighting device does not greatly vary according to days. In this way, it is possible to make a prediction for each day for only a following week and adopt an approximation that the prediction executed for the particular week can be repeatedly applied to the following month. In this case, it is considered that the following types of measured data can be used as input. One is data which was measured over a previous several days and whose measurement time is the same as that of the prediction. The other one is data which was measured over approximately a previous month and whose measurement time and day of the week are the same as those of the prediction.

In order to prevent making a misjudgment on whether or not operation of a lighting device is wasteful, it may be preferable to prioritize cutting of not only energy consumption located at such places as a place without tenants or a shared area, where a risk of misjudgment is low, but also energy consumption which is considered to be highly wasteful. The remote control server 150 generates plural patterns of schedules for lighting devices, taking into account which and how much wasteful energy consumption should be cut down.

An example how to determine cutting of wasteful energy consumption is described. Classification is prepared according to levels of wastefulness: energy consumption of a lighting device classified as level 0 is not cut down; only energy consumption of a lighting device classified as level 3 is cut down; energy consumption of a lighting device classified as 2 or 3 is cut down; and energy consumption of a lighting device classified as 1, 2 or 3 is cut down. The remote control device 150 determines a schedule for a lighting device and arranges control candidates based on the classification. Alternatively, it may be possible to prepare control candidates such as control candidate 1 (low reduction) and control candidate 2 (high reduction), which have a ratio of reduction according to the levels of wastefulness, respectively. For example, a control candidate 1 has levels of reduction: level 1 is meant to cut down energy consumption by 20%, 50% for level 2 and 80% for level 3. In contrast to it, a control candidate 2 has levels of reduction: 50% for level 1, 80% for level 2 and 100% for level 3. A diagram 405 in FIG. 4 is a schedule for lighting devices introducing a control candidate having 100% for a level 3c and 50% for level 1a.

It may be alternatively possible that a user registers a target reduction in energy cost resulting from cutting wasteful energy consumption along with an upper limit for energy cost.

It should be understood that the wasteful energy consumption by indirectly controlled units is difficult to cut by 100% because indirect control is more difficult and uncertain compared with direct control. Therefore, it may be preferable to separately calculate a reduction brought by the indirect control from that by the direct control, assuming that the reduction by indirect control contributes to the total reduction in energy consumption to some extent. Regarding a prediction for an amount of the reduction by the indirect control, the remote control server 150 may statistically analyze actual past data so as to obtain an average of reduction brought by the indirect control, for example.

After the remote control server 150 has determined a reduction ratio for each level, it determines how much and which part of wasteful consumption having the same level of wastefulness should be cut down. Three methods are described, for examples. First, the server 150 distributes a reduction for time zones in proportion to a product of priority stored in the area database and energy consumption. Second, the server 150 equally distributes a reduction when the time zones have the same priority. Third, when priorities continuously appear, the server 150 stars to cut energy consumption for a time zone having higher energy consumption so that the energy consumption or the operation ratio of a facility takes the same value in the time zones. It may be possible to register which of the methods is selected along with a priority in the area database.

It may be possible that a user or a service provider determines a priority. A row of values 410 in FIG. 4 is an example for the priority. It may be possible to automatically give a top priority only to a utilization time zone taking into account standard patterns of priority which are prepared according to the usage of an area such as an office or an entrance. In this connection, the utilization time zone for an area, such as working time for an office or shop hours for a business area, is registered in the area database.

If the same level of wastefulness appears, the remote control server 150 cuts energy consumption to which a lower priority is given. The reduction is adapted to be proportionate to an amount of wasteful energy consumption. On the other hand, within time zones having the same priority, a reduction is executed so that a ratio of reduction may be the same for each time zone, as shown by an element 406 in FIG. 4.

To the contrary, there are occasions where rescheduling is required when lighting devices which need to be on are not turned on. When the lighting devices are not turned on while it is known that plural persons are in an office according to operation of PC's or when manual turning on of the lighting devices frequently occurs, for example not less than twice a week in the same time zone, it is necessary to conduct rescheduling. If a schedule is updated so that a lighting device can be in operation so as to eliminate frequent manual canceling of control which restricts the lighting device from being turned on, this will not result in an increase in energy cost. The reason for this is that the energy consumption before updating of the schedule includes one by the lighting device which has been manually turned on. On the other hand, if a lighting device is turned on during a time zone, in which the lighting device has been turned off before updating the schedule according to operation of PC's and a schedule for the lighting device (or required electric power), an increase in energy cost will occur. The case described above which brings an increase in energy consumption is classified as a level 0.

The remote control server 150 predicts energy consumption for a lighting device with an energy consumption model according to the schedule (combined schedules). Converting the energy consumption into cost for each type of energy with a cost table, the server 150 provides a predicted energy cost when it executes control according to the schedule. Also, the server 150 predicts an energy cost for the lighting device with the energy consumption model on assumption that it is manually handled in the same way as before. Then the server 150 subtracts the former cost from the latter one, thereby providing an estimated reduction in energy cost. The server 150 stores a pair of the schedule and the estimated reduction in a temporary storage area.

When scheduling for reduction in wasteful energy consumption has already been introduced, it is anticipated that the estimated reduction in energy cost is zero or some number close to it if a comparison is made between the cost reduction cases, to which current and previous schedules are applied, respectively. Therefore, it may be reasonable to calculate a reduction in energy cost brought by energy management service based on an energy cost which is predicted for a normal schedule. When it is assumed that energy consumption while a reduction is implemented is less than that for normal operation by a predetermined constant ratio, it may be possible to introduce an average reduction ratio, which represents a ratio of energy consumption before and after introducing a reduction in wasteful energy consumption. In order to obtain the average reduction ratio, actual energy costs for other buildings can be used, which have similar usage and total floor areas as those of a subject building. In this connection, the actual energy costs are stored in the remote control server 150.

When a lighting device has an output regulator which is able to discretely or continuously adjust an electrical output between 0% and 100%, it may be possible to store a minimum output for each area, each lighting device and each time zone in the facility database and determine that an output exceeding the minimum output is classified as wasteful consumption. Though turning off of a lighting device sometimes leads to a reduction in comfortableness, it may be possible to cut the output to some extent.

As an example of a routine for generating an operational plan, description is given to scheduling for air conditioning during cost index control. When energy cost index control is conducted, it is necessary to predict a reduction in energy cost by introduction of a reduction in wasteful energy consumption. If a target reduction cannot be met, it is further necessary to apply control which has effect on comfortableness so as to satisfy the target reduction in energy cost. In an exemplary description below, it is assumed that control having effect on comfortableness is limited to scheduling of setting temperatures and scheduling is conducted so that a resultant cost reduction can add up to the target reduction.

Figure 9:
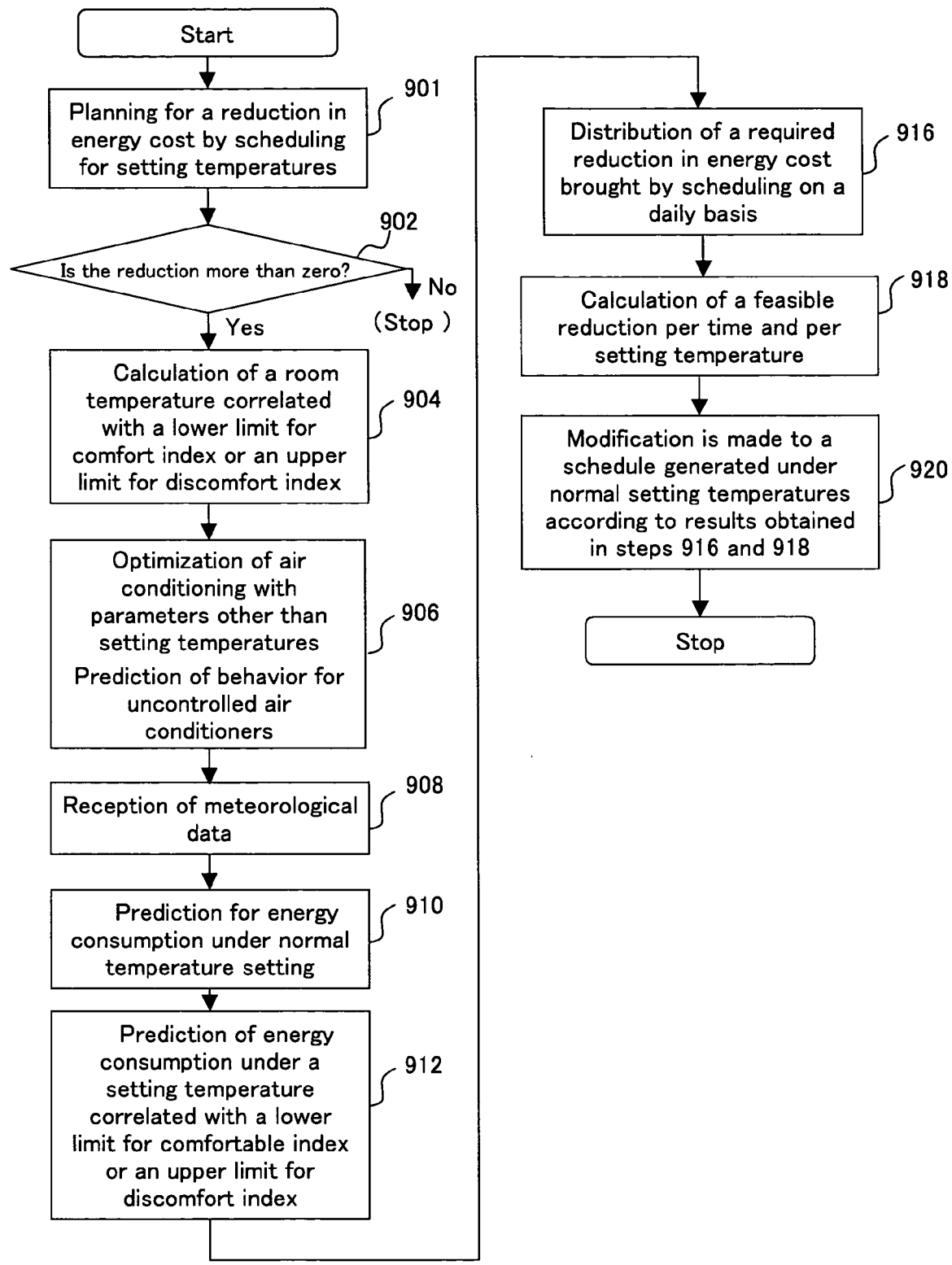
FIG. 9 is a flow chart showing steps for scheduling of setting temperatures for air conditioning.

FIG. 9 is a flowchart illustrating scheduling for setting temperatures. All processes shown in FIG. 9 are executed by the remote control server 150. A diagram 1000 as shown in FIG. 10 is used for describing how a setting temperature is determined.

In step 901, the remote control server 150 determines an energy cost which should be cut down by scheduling for setting temperatures. The server 150 first determines an energy cost which needs to be reduced by the end of a period of time, during which the server 150 conducts control. If energy management service has not been started, one of the following values is introduced. One is a monthly target reduction in energy cost required by a user. The other one is a value which results from subtraction of an upper limit from a predicted monthly energy cost while a nominal operation is conducted. If the service has already been started, a reduction in energy cost calculated based on an energy consumption data up to a previous day, which is stored in the BA server 102, is subtracted from the value described above.

Next, further subtracting an estimated reduction in energy cost, which is to be achieved by introducing cutting of wasteful energy consumption, from the value described above, the remote control server 150 obtains a reduction in energy cost which needs to be achieved by scheduling for setting temperatures by the end of the period of time.

In step 902, if a required reduction in energy cost is not more than zero, the flow stops in this step, because it is not necessary to conduct scheduling for setting temperatures during cost index control.

In step 904, the remote control server 150 determines an upper limit for a setting temperature during cooling in summer based on a lower limit for comfort index or an upper limit for discomfort index for a time zone. Similarly, the server 150 determines a lower limit for a setting temperature during heating in winter based on a lower limit for comfort index or an upper limit for discomfort index for a time zone. A comfort index or discomfort index is calculated from the temperature and humidity of a room. When an air conditioner is a type for which both temperature and humidity are set, it is preferable that the humidity is adapted to fall between 40 to 60%, which is generally considered to be a comfortable range. When it is not possible to set humidity for an air conditioner, the remote control server 150 incorporates an average value which is calculated for a time zone in terms of air conditioning, for cooling and heating separately, based on measured humidity data of a room, which is located in an area where the air conditioner implements air conditioning.

Generally speaking, a comfort index takes a maximum at a certain temperature. The comfort index will monotonously increases up to the maximum and monotonously decreases after it exceeds the maximum. Therefore, a range for setting temperature is selected so that it covers temperatures lower or higher than the temperature at which the comfort index takes the maximum, which contributes to a reduction in energy cost. In this way, a comfort index and a room temperature are correlated on a basis of one to one. If a discomfort index is selected, a similar approach can be applied.

In step 906, before the remote control server 150 conducts scheduling for cutting wasteful energy consumption, the server 150 determines contents of control so that air conditioning is optimized and an energy cost can be reduced independent of comfortableness and an upper limit for cost. The server 150 conducts a prediction for behavior of an area which the server 150 can not control, because its air conditioning system automatically controls the area. If the prediction for behavior of the area is carried out in a separate routine for generating an operational plan, the routine is prioritized to be executed prior to scheduling for setting temperatures in the energy saving control database 740. In contrast to it, if it is carried out in the same routine, algorism is arranged so that the prediction can be executed prior to scheduling for setting temperatures. An example for the algorithm is that the server 150 sequentially determines contents of control for a plurality of units in a time-sequential simulation with a physical model.

There is control with outside air as an example of optimized air conditioning. It includes air conditioning for a room conducted in the following manners. First, the remote control server 150 minimizes volume of outside air to be taken in according to a concentration of $CO_2$ existing in a room. Secondly, the server 150 makes outside air bypass a heat exchanger after it conducts comparison between conditions of room air (temperature, humidity and enthalpy) and the outside air. Thirdly, the server 150 reduces heat load at the start of air conditioning by stopping inflow of the outside air. The server 150 needs to predict conditions of room air so as to select the type of control with outside air, or so as to predict how the automatic air conditioning system of a building will work.

In the present embodiment, a physical model is applied to a model for air conditioning energy consumption so that both the conditions of room air and the type of control with outside air according to them can be simultaneously predicted. For another example of optimal air conditioning such as optimal stop, the server 150 is able to predict its behavior of control in the physical model. Parameters and connection of air conditioners are stored in the building database 710 or the area database. Information about operation of a unit which cannot be obtained from the BA server 102, for example information about a heat storage controller that it starts a heat storage tank at 10 p.m., is also registered.

It is necessary to predict heat load so as to predict energy consumption by air conditioning with a physical model. In the present embodiment, a neural network is selected, which is able to learn with back propagation, and meteorological data is introduced as an input. An actual heat load required for an analysis with the neural network is calculated in the following manner. The remote control server 150 calculates temporary energy consumption based on a temporary heat load and an actual operational data of a unit with the same physical model as that used in predicting energy consumption by air conditioning. The server 150 then conducts iteration to make the temporary energy consumption meet the actual data by updating the temporary heat load.

In step 908, the remote control server 150 receives meteorological data for a future period of time (a following month, for example), during which the server 150 provides control, from the meteorological information server 160 in the same manner as that of step 204. If the control has already been started, the server 150 gathers meteorological data, which covers a following day to the end of a month. If data covering a long period of time such as one month is not available in the meteorological information server 160, it may be alternatively possible to introduce standard meteorological data. Furthermore, it may be possible to select one of three types of standard meteorological data, which are prepared for hotter, medium and colder weather, according to long-term trend prediction made by the meteorological information server 160.

In step 910, the remote control server 150 predicts energy consumption and cost for each day of the future period of time when normal temperature setting is selected. The prediction is made under the assumption that the server 150 controls units other than air conditioners in fixed conditions. Meteorological prediction data and an energy consumption model for air conditioning are used for the prediction.

Normal setting temperatures are registered in the area database. The temperatures are prepared for cooling and heating, respectively, and for each area. If setting temperatures which have been used before introduction of the energy management service, it may be possible to adopt them. Furthermore, it may be possible to select one common value applicable to any time of the period or to determine time-sequentially values for each time zone. A line 1020 as shown in FIG. 10 is an example of a setting temperature. The control is limited to a period of time allowed for operation of air conditioning, which is exemplarily shown by an air conditioning starting time 1040 and an ending time 1045 as shown in FIG. 10.

In step 912, the remote control server 150 predicts energy consumption and cost for a setting temperature like step 910, which is correlated with the lower limit for comfortable index or the upper limit for discomfort index obtained in step 904. If the correlated temperature exceeds a lower limit or an upper limit set in advance for air conditioning, the remote control server 150 terminates air conditioning.

In step 914, the remote control server 150 calculates a difference in cost between normal setting temperature and setting temperature based on the lower limit for comfortable index (or the upper limit for discomfort index). In this way, the server 150 determines a maximum reduction in energy cost according to scheduling for setting temperatures based on the lower limit for comfortable index (or the upper limit for discomfort index). If the server 150 conducts calculation over one month, it provides a monthly maximum reduction in energy cost for the following month. On the other hand, if the server 150 conducts calculation for each day, it provides a daily maximum reduction in energy cost.

The reduction in energy cost brought by introduction of scheduling for setting temperatures is calculated by subtracting a predicted energy cost with scheduling for setting temperatures from a predicted energy cost under nominal setting temperatures. Compared with the description for step 305 in which normal operation of lighting devices is assumed, a schedule for lighting devices according to levels of cutting wasteful energy consumption is introduced in this example.

A maximum reduction in energy cost for overall operational plan can be calculated as a summation of reductions brought by other types of scheduling such as scheduling for lighting devices.

In this connection, the relation ships between comfortable index and cost shown in diagrams 550, 600 and 650 are obtained by repeating steps 912–914 while the lower limit for comfortable index or the upper limit for discomfort index is gradually changed.

In step 916, the remote control server 150 conducts distribution of the required reduction in energy cost obtained in step 910, which is brought by scheduling for setting temperatures. If planning is conducted in advance, for example for a following month, the required reduction is distributed for all days of the following month. If planning is carried out in the middle of a month, the required reduction is distributed for the remaining days (up to the end of the month).

In step 918, using calculated results for a following day in steps 910–914, the remote control server 150 calculates feasible reduction in energy cost per time and per setting temperature brought by scheduling for setting temperatures for the following day.

An area 1030 represents differences between a normal setting temperature 1010 and a setting temperature corresponding to the lower limit for comfortable index or the upper limit for discomfort index. Suppose a feasible reduction in energy cost per hour and setting temperature when air conditioning is lessened or stopped. This reduction is represented by a rectangle defined by time and temperature increments.

If it is possible to vary the setting temperature every one hour and the increment of the setting temperature is 1 degree Celsius, a rectangle 1050 is formed as shown in FIG. 10. The area of this rectangle is hereinafter referred to as "unit area".

If the remote control server 150 calculates energy consumption for a time zone according to the normal setting temperature 1010 and the setting temperature 1020 based on the low limit for comfortable index (or the upper limit for discomfort index), the server 150 is able to obtain feasible reduction in energy cost in the form of the unit area for a setting temperature and a time zone.

In step 920, the remote control server 150 varies a setting temperature by the unit area at a time so that the setting temperature rises during cooling and falls during heating relative to the normal setting temperature 1010. It should be noted that the variation should be made so that the reduction in energy cost brought by variation of setting temperature obtained in step 918 can not be less than that brought by scheduling for setting temperature obtained in step 916. A line 1060 in a diagram 1070 shown in FIG. 10 represents a schedule for setting temperature generated in step 920. In this example, it is seen that energy consumption is cut by 26 pieces of the unit area compared with operation with the normal setting temperature 1010.

In the above description, the reduction in energy cost is evaluated for the unit area (temperature and time increments). Though it is possible to conduct iteration by changing setting temperature until an estimated energy cost reaches not more than an upper limit for energy cost, it may be alternatively possible to calculate an approximate reduction for the unit area. This leads to a great reduction in an amount of calculation.

Changing of a setting temperature in step 922 is conducted based on a prioritized rank in the same manner as that applied to scheduling for lighting devices. It may be possible to prepare a plurality of prioritized ranks for operation of air conditioners so that a prioritized rank can be appropriately selected for scheduling according to conditions, for example seasons. As shown in FIG. 12, it is possible to consider an example for this approach, in which an operational pattern having low priority during daytime peak hours is adopted, for example a time zone of 1 p.m. to 4 p.m. to which a discount contract in terms of peak power adjustment is applied. There may be plural methods for providing this operational pattern. The remote control server 150 may have a predetermined pattern or automatically generate a pattern in which lower priority is given to a particular time zone of a following day that has an estimated power consumption exceeding a threshold. If electricity is concerned, it may be possible to determine prioritized ranks according to costs which are contractually defined according to time zones.

When normal setting temperatures differ according to time zones, the remote control server 150 selects a group of time zones which has the lowest priority, searching for a time zone having the lowest setting temperature in case of cooling so as to change the setting temperature. In case of heating, the server 150 searches for a time zone having the highest setting temperature. After the server 150 has changed setting temperatures by a unit temperature for all the time zones in the group, it moves to another group of time zones which has the secondly lowest priority. And the server 150 repeats the steps described above in order to execute another round of changes. If the server 150 finds a time zone which has priority greater than a predetermined value, it may be possible to skip a change of setting temperature.

Because the energy consumption of air conditioning is affected by heat dissipated by units such as lighting devices, it is necessary to prepare operational plans for air conditioning, taking into account combination with other units. Suppose there is a plurality of candidates for cutting wasteful consumption and these candidates should be incorporated into conditions for calculation carried out in steps 910 and 920. The remote control server 150 repeats steps 910–920 as many times as the number of candidates and generates an operational plan for each candidate. If there is only one candidate, for example scheduling for lighting devices, it may be sufficient for the server 150 to generate a schedule for setting temperatures that corresponds to each of the schedules for the lighting devices, which take into account the levels of cutting wasteful consumption. On the other hand, if there are too many combinations of candidates which require a great amount of calculations, it may be possible to select typical combinations as conditions for calculation.

When there are plural types of control which have effect on comfortableness, it may be possible to prepare a comfort index (or discomfort index) for each type of control and use the same approach which is applied to scheduling for setting temperatures of air conditioning. Examples for this case are described below. One example is that other factors which have effect on comfortableness in air conditioning are not limited to scheduling for setting temperatures. Another example is that the remote control server 150 controls light devices taking into account the relationship between illuminance and comfortableness. When a required reduction in energy cost is distributed for the types of control which have effect on comfortableness, it is possible to employ the following methods. The server 150 determines an independent control pattern for each type of control after it distributes the required reduction in proportion to a maximum feasible reduction in energy cost. Alternatively, the server 150 adjusts control patterns for the types of control so that comfortableness is slightly degraded for each type at the same time.

A schedule for lighting devices (plan for cutting wasteful consumption) and a schedule for setting temperatures which are obtained in the above steps make an operational plan. In step 256, the remote control server 150 provides a user with operational plans and requests him to select one. When the option for prioritizing cost reduction is selected, the server 150 simultaneously provides an estimated reduction in energy cost brought by introduction of scheduling for setting temperatures based on the lower limit for comfortable index. It may be possible to display the operational plans in order of greater estimated reduction in energy cost or smaller discomfort index.

Although the remote control server 150 determines conditions for energy cost and comfortableness in step 250, it may be possible to adopt the following alternative when items to be controlled are fixed. Skipping step 250, the server 150 in advance generates an operational plan in step 254 based on a combination of conditions associated with energy cost and comfortableness, providing the operational plan in step 256. In this case, selection of an operational plan in step 256 results in selection of conditions for energy cost and comfortableness. As indication 690 as shown in the diagram 650, it may be possible to show where the selected operational plan stands on a diagram, which shows the relationship between energy cost and comfortable index.

When the user has selected one of the operational plans, it will be transmitted from the service control server 155 to the remote control server 150 which stores it. In this way, the server 150 has completed the operational plan for a building to be controlled.

In step 260, between 2 a.m. and 5 a.m. of a current day, the remote control server 150 transmits contents of control, which are included in the operational plan, to be executed from 5 a.m. of the current day to 5 a.m. of a following day to the BEMS center module 101. The BEMS center module 101 is able to separately display the contents for indirect and direct control. In this way, a person in charge of the building obtains information which indicates how the units that are manually controlled should be controlled.

In step 262, the remote control server 150 executes control according to the operational plan.

A displayed page 1100 in FIG. 11 is an example of notification of contents for control. The displayed page 1100 is separated into a table for direct control items and the other table for indirect control items, on which directions 1125 requesting manual handling are indicated. In the present embodiment, a control item (controlled unit), time for executing control and a control location (controlled area) are described on the table. Furthermore, it may be possible to indicate an additional explanation in a note column if it is difficult to locate a control box or a difficult control method is required. In addition, it may be possible to display detailed contents, such as the diagram 1050 depicting a schedule for setting temperatures, which is shown on a display if a button 1130 is pressed.

It may be possible to transmit contents of control for an operational plan, which requires manual control for a unit conducted by a resident in a building, to the terminal 135 electrically connected to the LAN 130, so that the terminal 135 displays them. Following are examples for methods for transmission and display. The BEMS center module 101 converts the contents into e-mail and transmits them to the terminal 135. Alternatively, the BEMS center module 101 sends the contents to a computer program which is installed in the terminal 135 and able to receive and display them.

It may be possible to display the contents for indirect control on the BEMS center module 101 or the terminal 135 in the form of a checklist such as a list 1170 shown in FIG. 11 so that a person in charge of a building and a resident are able to properly conduct the contents for indirect control. It may be possible that the BEMS center module 101 sends the checklist, which can be printed on a paper, to the terminal 135 and a PDA used by the person in charge so that the checklist can be electronically accessed. In this case, it may be possible to introduce a scheduler program which has a function to alert by displaying and sound. The PDA and the terminal 135 send data, by which if a checkbox 1175 is checked is known, to the BEMS center module 101. The remote control server 150 can use the data to determine if the indirect control has been properly carried out.

The remote control server 150 correlates contents of control for directly controlled units with facility control information based on a transmission information database. This information includes commands requesting the BA server 102 to initiate control. The server 150 sends the contents to the BA server 102, which executes them. Alternatively, it may be possible that the BA server 102 sends the contents to each of the controlled units in the form of control information. Furthermore, it may be possible that the server 150 sends a schedule for lighting devices and a schedule for setting temperatures in the form of a pair of time when setting is conducted and an updated value. Subsequently, it may be possible that the pair of data is restored in the BA server 102 to control information, which is to be sent to each unit.

The remote control server 150 stores the contents for control which are sent to the BA server 102 in an executed control record. These make data which can be used for energy consumption prediction the same as the measured energy consumption data which is obtained under execution of control.

Examples are described for methods for executing control by the BA server 102. In case of a schedule for lighting device, the BA server 102 executes contents which include details of time-sequential output of the device determined by the remote control server 150. Another method is that the BA server 102 in which control steps are established changes only thresholds and modes according to signals received from the server 150. The other method is that the BA server 102 executes control in a closed local environment, basically not receiving commands sent by the server 150. The third method, which is useful for a unit that requires real time control but can not be remotely controlled, complements remote control applied to the energy management service. When an operational plan is also generated in a local environment, the third method can be combined with control for which an operational pattern is generated according to an upper limit for energy cost on a previous day.

An example for local control is described. When the BA server 102 finds that a predetermined time has elapsed, during which the operational ratio of PC's falls below a predetermined value or the number of PC's is not more than a predetermined value in an area, the BA server 102 controls to turn off or reduce output of lighting devices so as to reduce wasteful energy consumption. The operational ratio of PC's can be replaced with a ratio of present people in an office. Correlation between an area and its lighting devices is registered in the BEMS center module 101 in the form of a data table. Correlation between an area and locations of PC's is registered in the same manner. One PC can be registered for plural areas. This will prevent inconvenience that a user who is located between two lighting devices suffers from insufficient illuminance when one light is turned off regardless of the operation of the PC.

The operational ratio of PC's can be known by receiving response sent by the user of a PC to a network command sent by the BEMS center module 101. Alternatively, it may be possible to install a dedicated client program in a PC, which executes transmission of information about the PC operation at time intervals of 10 minutes, for example, to the BEMS center module 101. If the location of a PC in a building is registered in the client program and the location is transmitted with the information about the PC operation, it is easier to know the location of PC.

It may be possible to adopt the similar control for a package air conditioner. For example, it is possible to observe the operational ratio of PC's and predict a time when the operational ratio of PC's falls below a predetermined value by regression analysis. It is known that a method for optimal termination of air conditioning turns off an air conditioner prior to a planned turn-off time so that a room temperature starts departing from a setting temperature at the planned turn-off time. If the predicted time described above is used for a time for an optimal termination, it is possible to cut wasteful operation of air conditioners. It is understood that the method described above regards operation of air conditioning as wasteful usage while a ratio of present person in an office is low.

If the lighting devices and air conditioners are turned off for all the areas in a room according to the operational ratio of PC's, inconveniences for users would occur. In case of lighting devices, for example, though people are still in a room, it is anticipated that the room gets in darkness. In order to solve this problem, it may be possible to remove an area, where some units continue to be in operation latest on a day, from controlled items. Grouping of areas is stored in the BEMS center module 101 as a database. Alternatively, if the lighting devices are turned off when the operational ratio of PC's has reached zero, it may be possible to keep the lighting devices on during a predetermined period of time after the last PC has been turned off. An exemplary method for determining the period of time is to introduce an average or a maximum which is obtained from data inputted by users. In this case, a function for registering the period of time which a user desires is added to the client program for gathering PC operational information.

Demand control for electricity is one example for changing of thresholds. On the other hand, preparation of plural patterns applied to schedules for lighting devices and setting temperatures of air conditioning are examples for changing of patterns. The patterns are stored in the BA server 102 and the remote control server 150 determines which pattern is executed or whether or not control is skipped.

As an example for closed automatic control in a local environment, there is control with outside air. If a logic, which is prepared in the remote control server 150 for determining how to execute the control with outside air, is adapted to be the same as that used by the BA server 102, it may be possible to achieve better accuracy in predicting the behavior of the control with outside air executed by the BA server 102. When the BA server 102 does not execute the control with outside air but a Direct Digital Controller (DDC) does automatic control in a closed loop, the above description holds good.

Because the remote control server 150 uses predicted values for conditions of outside air and room air, the behavior predicted by the server 150 may possibly differ from the actual control executed by the BA server 102 if there are differences between predicted and actual conditions. In this case, it is possible to attribute the cause for the differences to false prediction of the conditions. In contrast to it, if the server 150 and the BA server 102 have different logics, it would be difficult to locate the cause for the differences.

Though the BA server 102 is able to execute control according to a schedule for setting temperatures sent by the remote control server 150, it may be alternatively possible to add one or both of the following two-step modifications so as to achieve better control.

As a first step, when an air conditioner is not adapted for setting humidity, the BA server 102 determines a new setting temperature according to actual conditions of room air each time the server 102 conducts air conditioning. In this case, the remote control server 150 does not send a setting temperature but a comfort index (or discomfort index) which is calculated based on the setting temperature and estimated humidity to the BA server 102. Referring to room humidity, the BA server 102 determines a setting temperature which is correlated with the comfort index sent by the server 150.

As a second step, the BA server 102 readjusts the setting temperature as a result of comparison between the setting temperature and an achieved room temperature, because the achieved room temperature does not necessarily meet the setting temperature. A setting temperature sent by the remote control server 150 or another temperature determined by the first step represents a desired temperature. A method described below may be an example for useful readjustment. The BA server 102 has a neural network which provides a predicted room temperature based on inputs such as a setting temperature, room humidity, an outside air temperature and outside air humidity and executes prediction by introducing an actual room temperature as a teacher signal. When the BA server 102 determines a setting temperature for an air conditioner, the server 102 varies the setting temperature, which is an input for the neural network, within a range applicable to the air conditioner, for example 20–30 degrees Celsius in summer and 16–26 degrees Celsius in winter. In this way, the BA server 102 is able to achieve adjustment for the air conditioner so as to make a predicted temperature meet a desired room temperature. If an increment of setting temperature for an air conditioner is one degree Celsius, it may be possible to use discreet values such as 20, 21, 22 degrees Celsius and the like.

It may be possible to modify control according to the number of people in a room and solar illuminance like the similar modification described above for air conditioning. However, when control is conducted taking into account actual conditions, it may be that a prediction for energy consumption differs from what has been predicted based on an operational plan. In this case, it is understood that an estimated reduction in energy cost should be regarded as a reference value.

When an upper limit for cost and a lower limit for comfortable index are registered in a middle of a month or an operational plan to be executed is modified without changing these upper and lower limits, the remote control server 150 conducts setting up for generating the operational plan in step 250. When a required reduction in energy cost is likely to be met, it is possible to change requirements for cost and the operational plan. Even if the upper limit for cost and the lower limit for comfortable index are the same, the operational plan needs to be updated, because conditions for energy consumption differ from that of a previous setting and the operational plan generated in step 254 does not necessarily meet requirements for cost and comfortableness.

If one month during which the remote control server 150 provides control is completed in step 265, the flow proceeds to step 272. Otherwise, the flow moves to step 270. If the energy management service is requested for the following month, steps beginning 210 are repeated.

In step 270, the service control server 155 displays the ongoing results up to now brought by introduction of the energy management service. FIG. 12 is a schematic diagram illustrating an example of displayed page. A diagram 1200 shows a monthly accumulated energy cost. A curve 1210 is an estimated cost when a nominal operation is conducted. In this connection, observed data covering the beginning of a month to a previous day is incorporated into an energy consumption model as meteorological input data. Predicted values are used for a period of time from a current day to the end of the month.

Curves 1220 and 1225 show a predicted energy cost when a facility is operated by the energy management service. The curves show an accumulation during the beginning to the end of month. The curve 1220 represents an actual cost during the beginning to the previous day of the month. On the other hand, the curve 1225 represents an estimated cost during the current day to the end of the month when remote control is continued according to the current operational plan. The actual cost is calculated based on measured energy consumption obtained from the BA server 102. The estimated cost is calculated from an estimated consumption predicted with an energy consumption model. Meteorological data which is incorporated into the energy consumption model as an input is the same as that used for prediction for the normal operation described above.

Evaluation 1230 indicates if an upper limit for energy cost or a target reduction in energy cost can be met at the end of a time period, namely the end of a month. FIG. 12 shows an example in which the requirements are going to be met. In case it is predicted that the requirements are not likely to be met, the evaluation 1230 indicates, for example, that "Requirements are unlikely to be met". Furthermore, it may be possible to move to step 250, indicating "Please change setting up for operation", "Please decrease a target reduction in energy cost" and the like so that the requirements can be met.

Cost index control and comfort index control are displayed by lines 1240 and 1245 respectively so that a user can know which type of control is applied to a day. Dotted line 1247 represents a plan for future days.

A diagram 1250 shows an example for an energy cost for a day. A curve 1260 shows an estimated cost when a normal operation is adopted. Elements 1270 and 1275 are actual energy costs for controlled units and uncontrolled units, respectively, during the beginning to the previous day of a month. Elements 1280 and 1285 are predicted energy costs for the same units, respectively, during the current day to the end of a month, if a current operational plan is continued. It is possible to separately show an energy cost for a type of energy.

Diagram 1300 shown in FIG. 13 is an example illustrating a reduction in energy cost, which is classified into a reduction 1310 by cutting wasteful consumption and a reduction 1315 by lowering comfortable index. A daily comfort index (average) 1320 and an estimated comfort index (average) 1325 when only lowering of comfortable index is introduced without cutting wasteful consumption as well as a required lower limit for comfortable index 1330 are displayed. In this way, it is possible to know contribution of cutting wasteful consumption according to prioritized ranks to the reduction in energy cost and maintenance of comfortableness.

In addition, it may be possible to calculate and display an amount of discharged $CO_2$. If the amount of discharged $CO_2$ is registered for requirements in setting up for operation in step 250, the terminal 135 always displays it. Energy consumption and a reduction in energy cost can be displayed in relation to the discharged $CO_2$ in the similar manner as that of comfortable index.

It is possible to display results of evaluation that a target reduction in energy cost or an upper limit for energy cost cannot be met in step 270 in stead of step 244. It is also possible to display the estimated cause for unsuccessfulness. A chart 1350 in FIG. 13 is an example of showing the cause. When a user checks one of check boxes 1360 which he regards as a possible cause and presses an OK button 1370, the information is sent to the remote control server 150 and stored in it. The information becomes operational record data and is used in predicting energy consumption for next and further rounds.

Several exemplary methods for estimating causes for not satisfying a target reduction in energy cost are described below.

First method uses comparison between contents of control planned by the remote control server 150 and those executed by the BA server 102 so as to find out differences. When the BA server 102 executes automatic control, it may occur that the BA server conducts control which is different from behavior that is predicted by the remote control server 150. In case of an automatic control in a closed loop conducted by DDC, it is also possible to compare operational information stored by the BA server 102 with behavior predicted by the remote control server 150. Furthermore, when remote control is cancelled by manual handling, it is possible to find it out if the BA server 102 is adapted to register the manual handling or a comparison is made between information about operation of a unit recorded by the BA server 102 and contents of control planned by the remote control server 150.

A second method uses comparison between an estimated value, such as meteorological data which is used for an input for an energy consumption model, and measured data. When there is a big difference between estimated energy consumption with the energy consumption model and actual energy consumption recorded by the BA server 102, input data for the model is investigated. If there is a big difference in input data between prediction and measurement, and updated energy consumption predicted based on the actual conditions improves accuracy, it may be possible to conclude that the false input data for the prediction is the cause for the difference.

If a cause is found out as a result of investigation with one of the first and second methods, it is possible to display detailed control contents applied to the prediction and measurement as well as input data for the energy consumption model.

A third method is that the remote control server 150 receives a signal indicative of failure of a unit through the BA server 102 so as to know the failure. When failure occurs, it may be possible to impute the cause to the failure of the unit if predicted energy consumption without incorporating the failure of the unit greatly differs from measured one.

According to a fourth method, investigation is made for usage for an area recorded in the area database. For this purpose, it is prepared that if there is a movement in tenants, the usage for each area is registered. The input of this information may be conducted by a user or a service provider. When energy consumption by a feeder or facility differs greatly from estimated one, it may be possible to attribute the cause to the usage if there is change in it as a result of investigating the area database in the middle of a time period.

According to a fifth method, investigation is conducted for a facility, whose predicted energy consumption greatly differs from measured data, so as to check if it includes an indirectly controlled unit. If it includes one, it implies that control contents for the indirect control unit may not have been properly implemented according to an operational plan provided by the remote control server 150.

The methods described above can be applied not only to a case where a target reduction in energy cost can not be met but also to another case where there is a great difference in energy consumption between prediction and measurement.

Furthermore, the difference in energy consumption (or energy cost) between prediction and measurement can be classified into categories by introducing the methods described above. For example, the cause for a difference is separately attributed in terms of responsibility to an inevitable one caused by failure of a unit, manual operation by a user and an unknown one.

It may be possible to display a difference in energy consumption or cost between prediction and measurement, classifying into categories in terms of cause which is pinpointed or estimated. Those which can not be pinpointed or estimated are classified as the unknown. Alternatively, it may be classified into categories in terms of responsibility. The shortage relative to requirements such as an upper limit for energy cost and a target reduction in energy cost can also be displayed being classified into types of causes.

In step 272, the remote control server 150 provides a user with displaying of results brought by the energy management service. Displayed contents are basically the same as those in step 270 but evaluation whether or not a target reduction in energy cost is likely to be met is replaced with results brought by the service.

It may be possible to open information displayed in steps 270 and 272 to the residents in a building via an intranet. Furthermore, it may be possible to display ongoing and previous results of operation so that a user can input setting up for operation in step 250 while he is seeing these results as well as steps 270 and 172.

Description is given of a method for calculating a comfort index and a discomfort index. There are two methods which are applied to calculation of these indexes. One uses a logical formula. The other one uses a sensible environment report which a user sends.

There are comfort indexes which are calculated with logical formulas such as Predicted Mean Vote (PMV) registered as ISO-7730 and New Effective Temperature (ET) used by the American Society of Heating, Refrigerating and Air-Conditioning Engineers (ASHRAE).

On the other hand, there are discomfort indexes which are calculated with logical formulas such as Predicted Percentage of Dissatisfied (PPD) which is deduced from PMV and Discomfort Index (DI) used by National Oceanic and Atmospheric Administration. Because it is known that 50% of people feel uncomfortable when DI is 77 and 100% when DI is 85, it may be possible to display ratio of people feeling uncomfortable which is converted from DI with a linear function so that a user can register an upper limit for discomfort index. It may also be possible to apply the same approach to ET.

Because PMV, ET and PPD take into account such parameters as clothing and an air current in addition to temperature and humidity, it is necessary to assume the parameters other than temperature and humidity. For example, a workload of a resident is assumed based on usage of an area obtained from the area database and a workload table prepared for the usage of the area.

Figure 14:
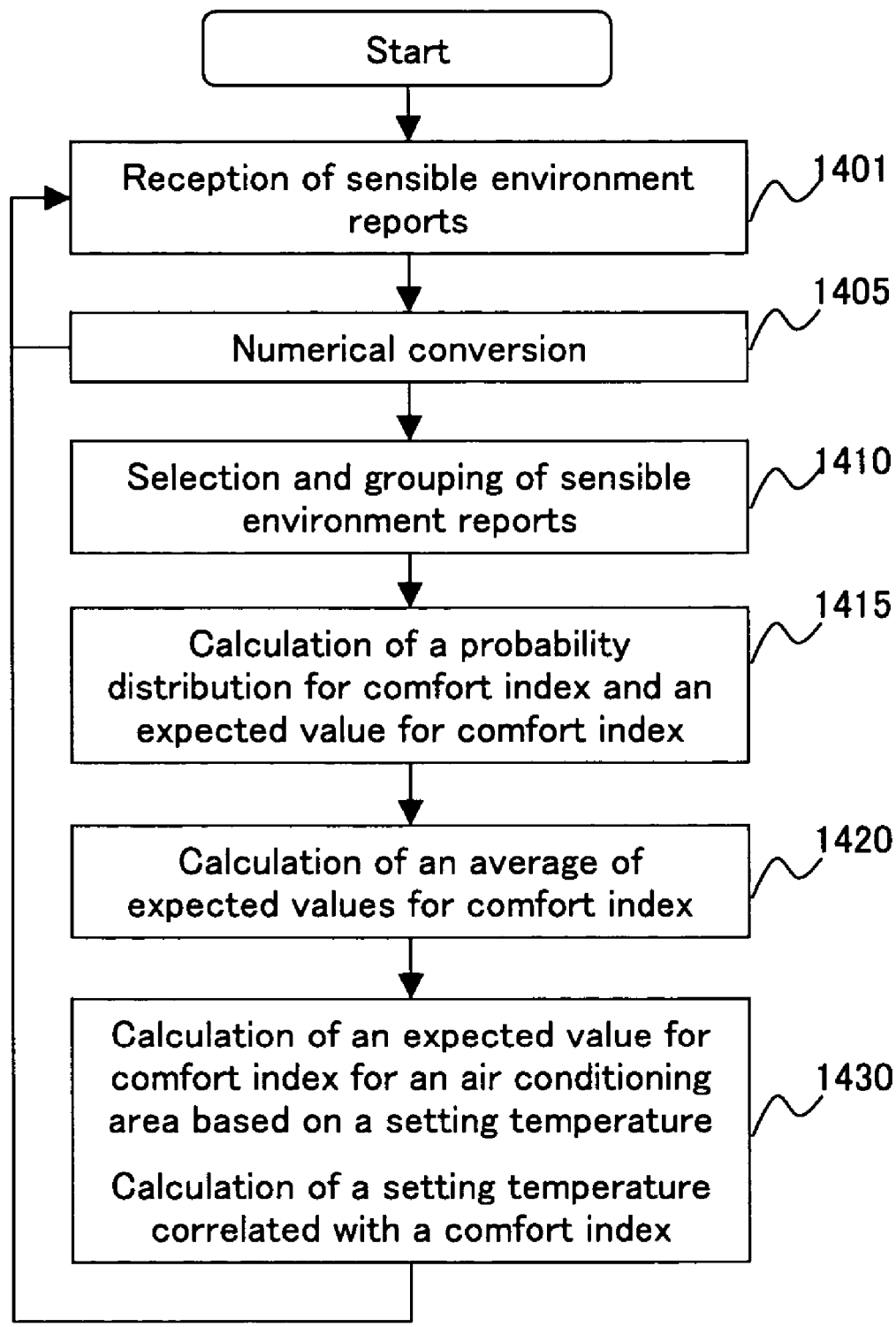
FIG. 14 is a flow chart showing steps for calculating a comfort index or discomfort index with sensible environmental data.
Figure 16:
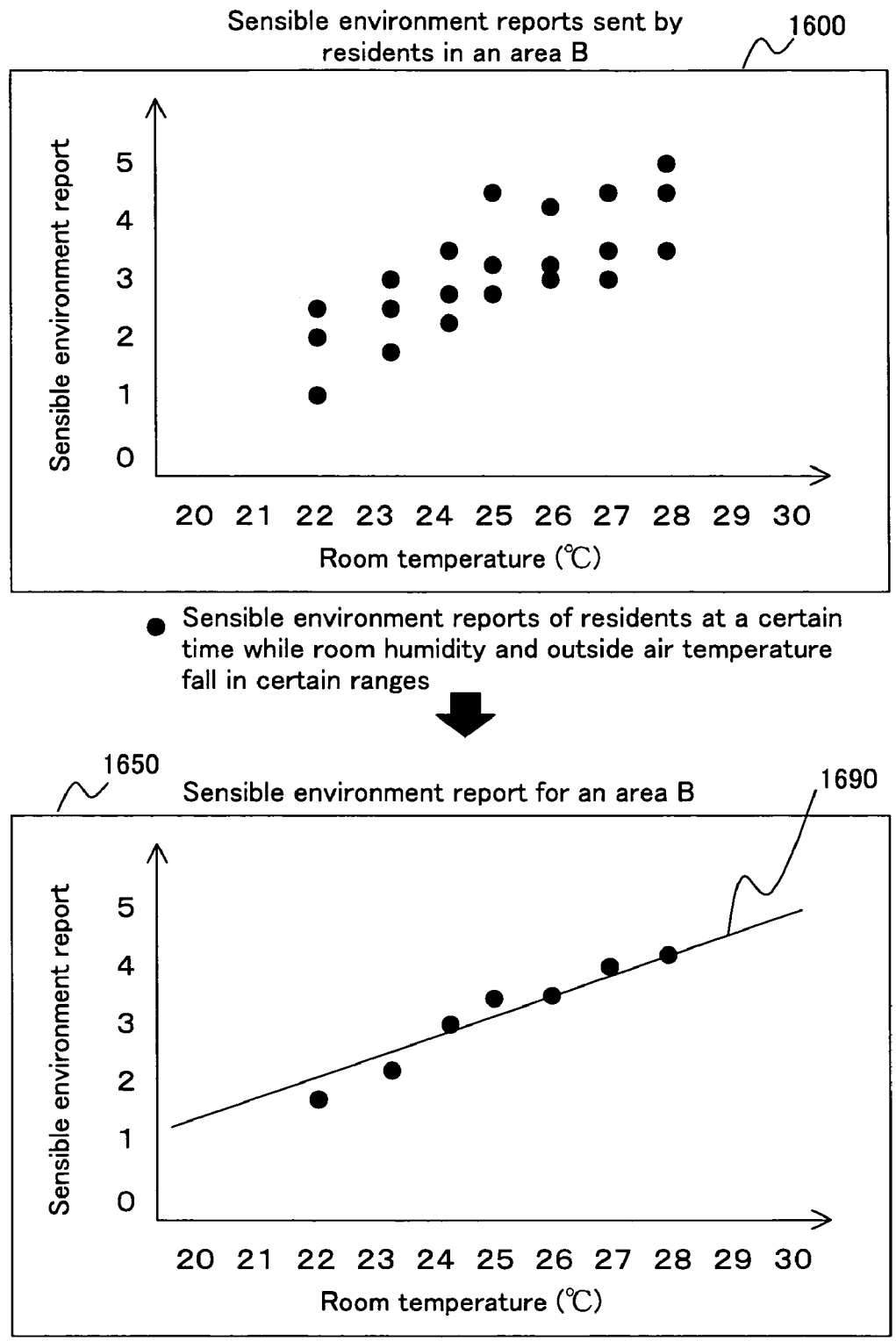
FIG. 16 is a schematic diagram illustrating an example of processing sensible environmental data.

FIG. 14 is a flow chart showing a flow for calculating a comfort index according to a setting temperature or a room temperature, taking into account the sensible environment report which a user registers. If the setting temperature is replaced with an actual room temperature, the same flow holds true. Furthermore, the flow is applicable to calculation of a discomfort index. FIGS. 15 and 16 are schematic diagram illustrating examples of calculation of comfort index.

In step 1401, the BEMS center module 101 receives sensible environment reports sent by people in areas of a building to which the energy management service is applied. Methods for sending a report include one with a client computer program installed in a PC, one with a portal web site on an intranet prepared for employees and the like. In case of the client computer program, the BEMS center module 101 gathers the report. It may be possible to adopt either a method that a user voluntarily sends the report or a method that the BEMS center module 101 requests the user to send it. If a web site is used, the BEMS center module 101 serves as a web server. The user sends his personal ID as well, thereby identifying him. An example of selections applied to the sensible environment report is made of several ranks, which the user selects, including "very hot", "hot", "a little hot", "comfortable", "a little cold", "cold" and "very cold".

In step 1405, the BEMS center 101 translates the ranks into numbers, such as "very hot"=+5, "comfortable"=0, "very cold"=−5 and the like, storing a number selected by the user in its storage area in combination with his personal ID, time and date, room temperature, room humidity, outside air temperature and the like. In this connection, such data as measured data gathered by the BA server 102 and meteorological observation data gathered by the meteorological information server 160 are adopted for the temperature and humidity. It may be possible to limit memory size and a valid period of time for a report, so that the obsolete past reports are deleted. Furthermore, it may be possible to prepare separate memories for heating and cooling.

Diagram 1500 represents an example of scatter diagram showing the relationship between room temperature and room humidity, in the form of numbers translated from sensible environment reports. As shown in the diagram 1500, an outside air temperature may be omitted so as to simplify description.

In step 1410, from a sensible environment report sent by a user, a group of data is picked up which includes outside air temperature and room humidity that fall within predetermined ranges, for example ±0.5 degrees Celsius for temperature, at the time of calculating a comfort index. In the diagram 1500, data within an area 1510 is picked up, which is considered to be useful for calculating a comfort index. The sensible environment report is classified into groups according to typical room temperatures, which are closest to feasible setting temperatures, for example 20, 21, 22 degrees Celsius . . . , if an increment of setting temperature for an air conditioner is 1 degree Celsius. If the sensible environment report within an area 1520 is selected for grouping, it results in a grouping based on a room temperature of 25 degrees Celsius. In this connection, if a comfort index is obtained by prediction, predicted values are used for an outside air temperature and room humidity. If a comfort index is obtained based on actual data, measured data is used for an outside air temperature and room humidity.

In step 1415, the remote control server 150 calculates a probability distribution for comfort index for a feasible setting temperature so as to determine an expected value for comfort index. If there is not a sensible environment report, a calculated value by a logical formula replaces the expected value. A diagram 1530 represents a probability distribution for data in the sensible environment report, which exist in a common area of 1510 and 1520. The server 150 calculates an expected value for comfort index using this distribution. A diagram 1600 shown in FIG. 16 is an example depicting comfort indexes sent by people in an area in the form of a distribution chart.

In step 1420, the remote control server 150 calculates an average of expected values for comfort index of the people existing in the area at a certain time according to the typical room temperatures selected in step 1410. There are methods for identifying the people in the area. One is to investigate PC's by a network command ping and determine the user of a PC in a room with a table correlating the PC and its user. Another method is to use an open schedule on a group ware. If it is not possible to know who is in an office, it may be possible to calculate an average of expected values for comfort index for all the people. For this purpose, it is necessary to register people who would possibly remain in the office in the area data base. A diagram 1650 depicts averages for the data shown in the diagram 1600 according to typical room temperatures.

In this way, in step 1430, it is possible to obtain an expected value for comfort index for an air conditioning area based on a setting temperature. When the remote control server 150*a* determines a setting temperature correlated with a comfort index, it searches for one which has the closest absolute value of the expected value. If a low limit for comfort index is requested, it is possible to calculate a setting temperature which is correlated with the limit.

Even if a user sends many sensible environment reports, it will not adversely affect a true probability distribution of comfortable indexes. Because a setting temperature is not directly changed according to a sensible environment report, it may not occur that comfortableness can not be determined during a time zone in which extreme temperature change occurs or a sensible environment report is not sent by a user.

A probability distribution of comfort index for a resident in a building and that for an air conditioning area may be opened to a user by a portal web site on an intranet, for example, which is able to identify the user and vary contents of display a user to another.

In steps 1410 and 1420, it may be possible to introduce curve fitting of either a monotonic decrease or a monotonic increase function with least-square method for a diagram which has a horizontal axis of air temperature and a vertical axis of an expected value for comfort index. The curve fitting is made between a setting temperature having a maximal expected value for comfort index and another setting temperature which reduces energy cost, namely a warmer side of temperature for cooling in summer and a cooler side of temperature for heating in winter. A setting temperature and an expected value for comfort index are correlated one to one. A line 1690 in the diagram 1650 represents results of a curve fitting conducted in step 1420.

If turning on and off is repeated so as to save energy cost, it may result in an increase in cost for replacement and repair due to an increase in failure and the degradation of life of a unit. This may sometimes require more expenditure than an achieved reduction in energy cost. The same situation may occur due to deterioration of efficiency. Therefore, it is important to reduce a total cost in terms of Life Cycle Cost (LCC).

When a selection for service contents of energy management service is conducted in step 201, it may be possible to add an option whether or not a user desires a cost reduction in terms of LCC. When the user selects LCC, a constraint is introduced into a routine for generating an operational plan, which cancels the energy management service if a summation of a cost for maintenance of a unit and a coming increase in energy cost is greater than an expected reduction in energy cost. In this way, it is possible to achieve more reduction in energy cost long term when the energy management service with LCC is conducted.

For example, it is known that turning on and off a fluorescent lamp once degrades its life by 1 hour. It means that if the cost of a fluorescent lamp is x yen and its expected life is h hours, a loss of x/h yen (cost increase) will occur. In scheduling for a fluorescent lamp without LCC, as a result of comparison between an expected cost reduction in electricity of the fluorescent lamp by turning it off and an expected loss associated with degradation of life, if the loss is found greater than the reduction, the turning off of the fluorescent lamp is cancelled.

Because it is possible to predict an increase in maintenance cost of a unit per turning on and off, the increase can be registered in the facility database. In this way, the similar determination whether or not control such as the one applied to a fluorescent lamp should be conducted can be prepared in the last part of a routine for generating an operational plan. Furthermore, it may be possible to include a maintenance cost such as man-hour expenditure and an anticipated loss based on probability for cancellation of tenants in addition to a cost associated with a unit in determining whether or not the energy management service should be conducted.

FIG. 17 is a schematic diagram illustrating a displayed page which the service control server 155 provide to candidates who are to join the energy management service such as potential customers.

When a user inputs conditions, such as usage, a total floor area, contractual wattage and a region, into a module 1750 for inputting retrieval conditions so as to make retrieval, the service control server 155 picks up buildings, which meet or are close to the conditions, out of buildings stored in the facility database. And the server 155 lists up the buildings on a display 1770 for retrieval results in order of high reduction ratio of energy cost. The buildings meeting or being close to the conditions mean that they have the same usage and fall in certain ranges of contractual wattage, total floor area and latitude-longitude (region).

When the service control server 155 selects a building from a building list 1780, it displays basic data for the building (usage, total floor area, contractual wattage, region, year-month-day of built, structure of air conditioning) on a display 1730 for basic data and actual operation data such as the diagram 501 shown in FIG. 5 as well as FIGS. 12 and 13 on a display 1700 for actual operation data.

Because the actual operation data is displayed as described above, it is possible to demonstrate effect of the energy management service which prioritizes cutting of wasteful energy consumption for a candidate who would be a new customer.

b. Second Embodiment

In addition to FIG. 1, another structure of units which supply a service according to the present invention may be possible. In this example, an intranet for OA system and a BA communication line are completely separated. A PC operational information server 1836 gathers PC operational information every 10 minutes, sending it to a remote control server 150 and a BA server 102. A dedicated fire wall 1803 exists between the BA server 102 and an internet. When a web site is used in order to send a sensible environment report, the report is sent to the BA server 102 while the remote control server 150 serves as a web server.

Figure 18:
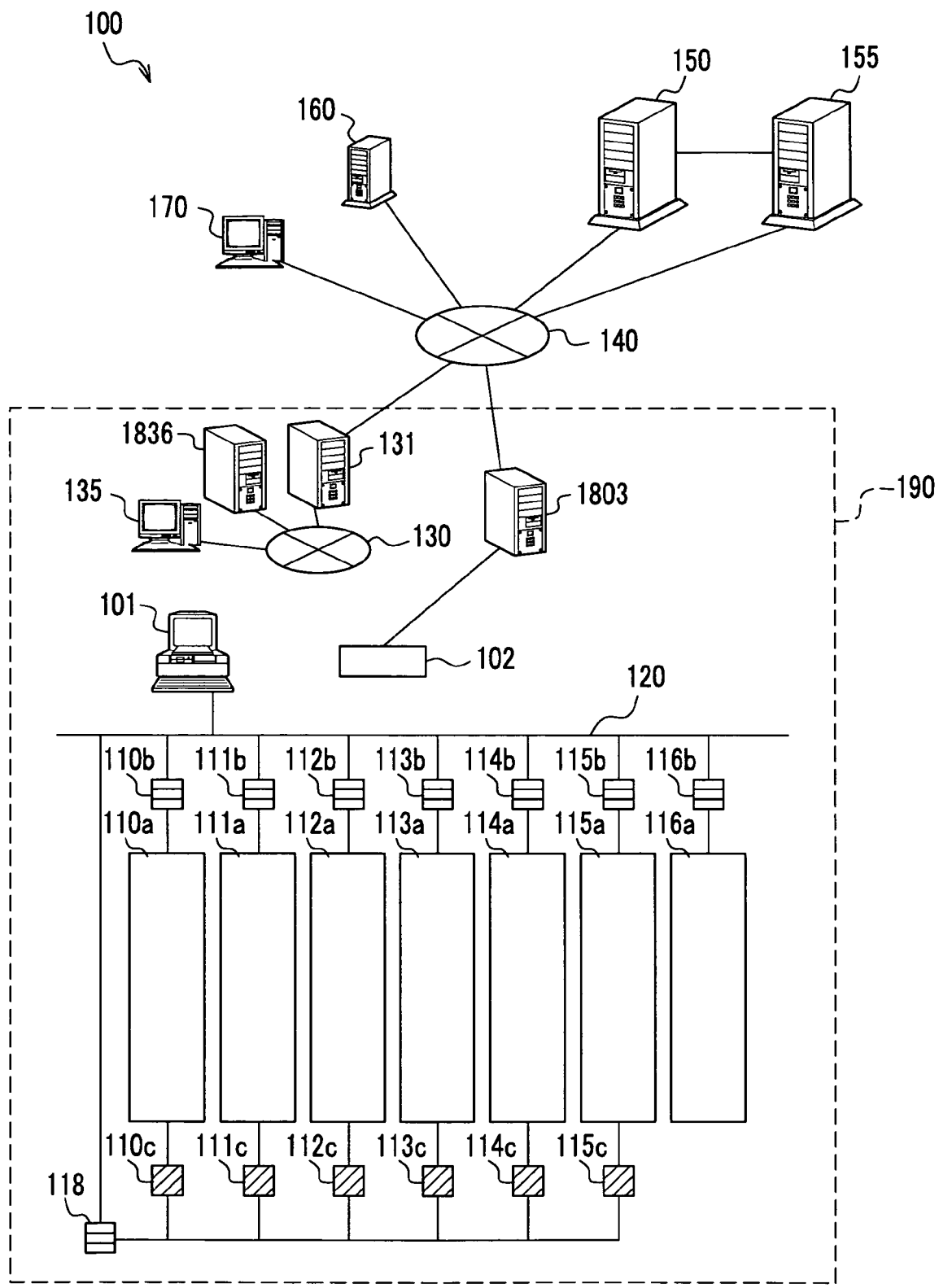
FIG. 18 is a schematic diagram illustrating structure of a system for managing energy consumption according to the present invention.

It may be possible for the BA server 102 to include the function which the BEMS center module 101 carries out in the embodiment as shown in FIG. 1 according to the present invention. Both in FIGS. 1 and 18, when an operational plan is not remotely generated but is generated in a local environment, namely within a building, the BA server 102 covers the function of the remote control server 150.

According to the embodiment described above, it is possible to provide a system for generating an operational plan for a facility. The system is able to generate and provide the operational plan in which cutting of wasteful energy consumption is prioritized, reductions in energy consumption and cost are efficiently implemented and a balance between comfortableness and energy cost is achieved. Also it is possible to provide a system which is able to control the facility according to the operational plan.

Furthermore, the system is able not only to remotely control a building introducing an energy cost index but also to provide a customer with evident advantages in terms of cost.

c. Third Embodiment

It may be possible to install a computer program in a PC, which makes the PC to execute the processes described above, so that the PC may serve as the BA server and the BEMS center module.

Foreign priority document, JP2003-369770, filed Oct. 30, 2003, is hereby incorporated by reference.

What is claimed is:

1. A system for managing energy consumption comprising:
   a data storage module for storing an operational past record of a unit belonging to a facility to be managed by the system;
   a first calculation module calculating wasteful energy consumption for the unit based on the operational past record stored in the data storage module; and
   an operation planning module for generating an operational plan for the unit belonging to the facility based on the wasteful energy consumption calculated by the first calculation module; and
   a determination module for determining a level classifying the wasteful energy consumption, wherein the operation planning module generates the operational plan based on the level.

2. A system according to claim 1 wherein the operation planning module generates the operational plan based on predetermined prioritized ranks which are defined for an area of the facility according to daily time zones.

3. A system according to claim 1, further comprising:
   a second calculation module for calculating energy consumption for the facility when the unit is operated according to the operational plan generated by the operation planning module; and
   a display module for displaying the energy consumption.

4. A system according to claim 2, further comprising:
   a second calculation module for calculating energy consumption for the facility when the unit is operated according to the operational plan generated by the operation planning module; and
   a display module for displaying the energy consumption.

5. A system for managing energy consumption comprising:
   a data storage module for storing an operational past record of a unit belonging to a facility to be managed by the system;
   a first calculation module calculating wasteful energy consumption for the unit based on the operational past record stored in the data storage module; and
   an operation planning module for generating an operational plan for the unit belonging to the facility based on the wasteful energy consumption calculated by the first calculation module; and
   a receiver module for receiving a signal indicative of operation of information equipment belonging to the facility; and
   a prediction module for providing a predicted operational past record of the unit belonging to the facility based on the operation of the information equipment,
   wherein the first calculation module calculates wasteful energy consumption for the facility based on the predicted operational past record.

6. A system according to claim 5, further comprising:
   a second calculation module for calculating energy consumption for the facility when the unit is operated according to the operational plan generated by the operation planning module; and
   a display module for displaying the energy consumption.

7. A system for managing energy consumption comprising:
   a receiver module for receiving a signal indicative of one of a lower limit for a comfort index and an upper limit for a discomfort index, which a user sets with means for entering data for a facility to be managed by the system;
   a data storage module for storing the signal received by the receiver module; and
   an operation planning module for generating an operational plan for a unit belonging to the facility based on the signal stored by the data storage module, wherein the operational plan includes a calculation of wasteful energy consumption for the unit based on an operational past record of the unit.

8. A system according to claim 7, wherein the signal is indicative of an upper limit for energy cost.

9. A system according to claim 7, further comprising a display module for displaying a relationship between energy cost and comfort index for one of the lower limit and the upper limit.

10. A system according to claim 8, further comprising a display module for indicating that the upper limit for energy cost or a target reduction in energy cost is not likely to be met.

11. A system for managing energy consumption, comprising:
   a receiver module for receiving a signal indicative of one of a lower limit for a comfort index and an upper limit for a discomfort index set by a user for a faculty to be managed by the system,
   a data storage module for storing the signal received by the signal module; and
   an operation planning module for generating an operational plan for the unit belonging to the facility based on the signal stored by the data storage module,
   wherein the signal is indicative of the upper limit for an amount of discharged greenhouse gasses.

12. A system for managing energy consumption, comprising:
- a receiver module for receiving a signal indicative of one of a lower limit for a comfort index and an upper limit for a discomfort index set by a user for a faculty to be managed by the system;
- a data storage module for storing the signal received by the receiver module; and
- an operation planning module for generating an operational plan for a unit belonging to the facility based on the signal stored by the data storage module;
- a candidate generation module for generating a plurality of candidates for the operation plan; and
- a third calculation module for calculating the lower limit for the comfort index and the upper limit for the discomfort index required for the candidates generated by the candidate generation module,
- wherein the operation planning module selects one of the candidates which satisfies one of the lower limit for the comfort index and the upper limit for the discomfort index calculated by the third calculation module, thereby generating the operational plan.

13. A system according to claim 12, wherein the third calculation module calculates the lower limit for the comfort index and the upper limit for the discomfort index, taking into account an environment report.

14. A computer program for a computer of a system for managing energy consumption, wherein the computer program is executed in the computer in a process comprising:
- storing an operational record of a unit belonging to a facility to be managed by the system,
- calculating wasteful energy consumption for the unit based on the operational record;
- determining a level classifying the wasteful energy consumption; and
- generating an operational plan for the unit belonging to the facility based on the wasteful energy consumption.

15. A method for managing energy consumption comprising:
- storing an operational record of a unit belonging to a facility to be managed by the method;
- calculating wasteful energy consumption for the unit based on the operational record;
- determining a level classifying the wasteful energy consumption; and
- generating an operational plan for the unit belonging to the facility based on the wasteful energy consumption.

16. A system for managing energy consumption comprising:
- a data storage module for storing an operational past record of a unit belonging to a facility to be managed by the system;
- a first calculation module calculating wasteful energy consumption for the unit based on the operational past record stored in the data storage module;
- an operation planning module for generating an operational plan for the unit belonging to the facility based on the wasteful energy consumption calculated by the first calculation module;
- means for obtaining data of a ratio of occupants in an area or the number of people in a room;
- a receiver module for receiving the data of the ratio of occupants or the number of people; and
- a prediction module for providing a predicted operational past record of the unit belonging to the facility based on the data of the ratio of occupants or the number of people,
- wherein the first calculation module calculates wasteful energy consumption for the facility based on the predicted operational past record.

* * * * *